(12) United States Patent
Chakrabarty et al.

(10) Patent No.: US 11,106,189 B2
(45) Date of Patent: Aug. 31, 2021

(54) SYSTEM AND METHOD FOR DATA-DRIVEN CONTROL OF CONSTRAINED SYSTEM

(71) Applicant: Mitsubishi Electric Research Laboratories, Inc., Cambridge, MA (US)

(72) Inventors: Ankush Chakrabarty, Cambridge, MA (US); Rien Quirynen, Boston, MA (US); Claus Danielson, Somerville, MA (US); Weinan Gao, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 102 days.

(21) Appl. No.: 16/293,818

(22) Filed: Mar. 6, 2019

(65) Prior Publication Data

US 2020/0285209 A1    Sep. 10, 2020

(51) Int. Cl.
| | | |
|---|---|---|
| *G05B 19/045* | (2006.01) | |
| *G06F 17/11* | (2006.01) | |
| *G06F 17/16* | (2006.01) | |
| *G08G 1/16* | (2006.01) | |

(52) U.S. Cl.
CPC ............ *G05B 19/045* (2013.01); *G06F 17/11* (2013.01); *G06F 17/16* (2013.01); *G08G 1/162* (2013.01); *G08G 1/163* (2013.01)

(58) Field of Classification Search
CPC ....................................... G06F 17/11
USPC ........................................................... 700/12
See application file for complete search history.

(56) References Cited

U.S. PATENT DOCUMENTS

| | | | | |
|---|---|---|---|---|
| 2009/0058346 | A1* | 3/2009 | Marushita | G05D 19/02 318/611 |
| 2016/0147203 | A1* | 5/2016 | Di Cairano | G05B 13/042 700/30 |
| 2016/0202670 | A1* | 7/2016 | Ansari | G05B 13/048 700/45 |
| 2016/0246277 | A1* | 8/2016 | Nikovski | G05B 13/048 |
| 2016/0357169 | A1* | 12/2016 | Di Cairano | G05B 13/048 |
| 2018/0011488 | A1* | 1/2018 | Nishi | G05D 1/0221 |

\* cited by examiner

*Primary Examiner* — Md Azad
(74) *Attorney, Agent, or Firm* — Gene Vinokur; Hironori Tsukamoto

(57) ABSTRACT

A machine subject to state and control input constraints is control, while the control policy is learned from data collected during an operation of the machine. To ensure satisfaction of the constraints, the state of machine is maintained within a constraint admissible invariant set (CAIS) satisfying the constraints and the machine is controlled with corresponding control policy mapping a state of the system within the CAIS to a control input satisfying the control input constraints. The machine is controlled using a constrained policy iteration, in which a constrained policy evaluation updates CAIS and value function and a constrained policy improvement updates control policy that improves the cost function of operation according to the updated CAIS and the corresponding updated value function.

20 Claims, 20 Drawing Sheets

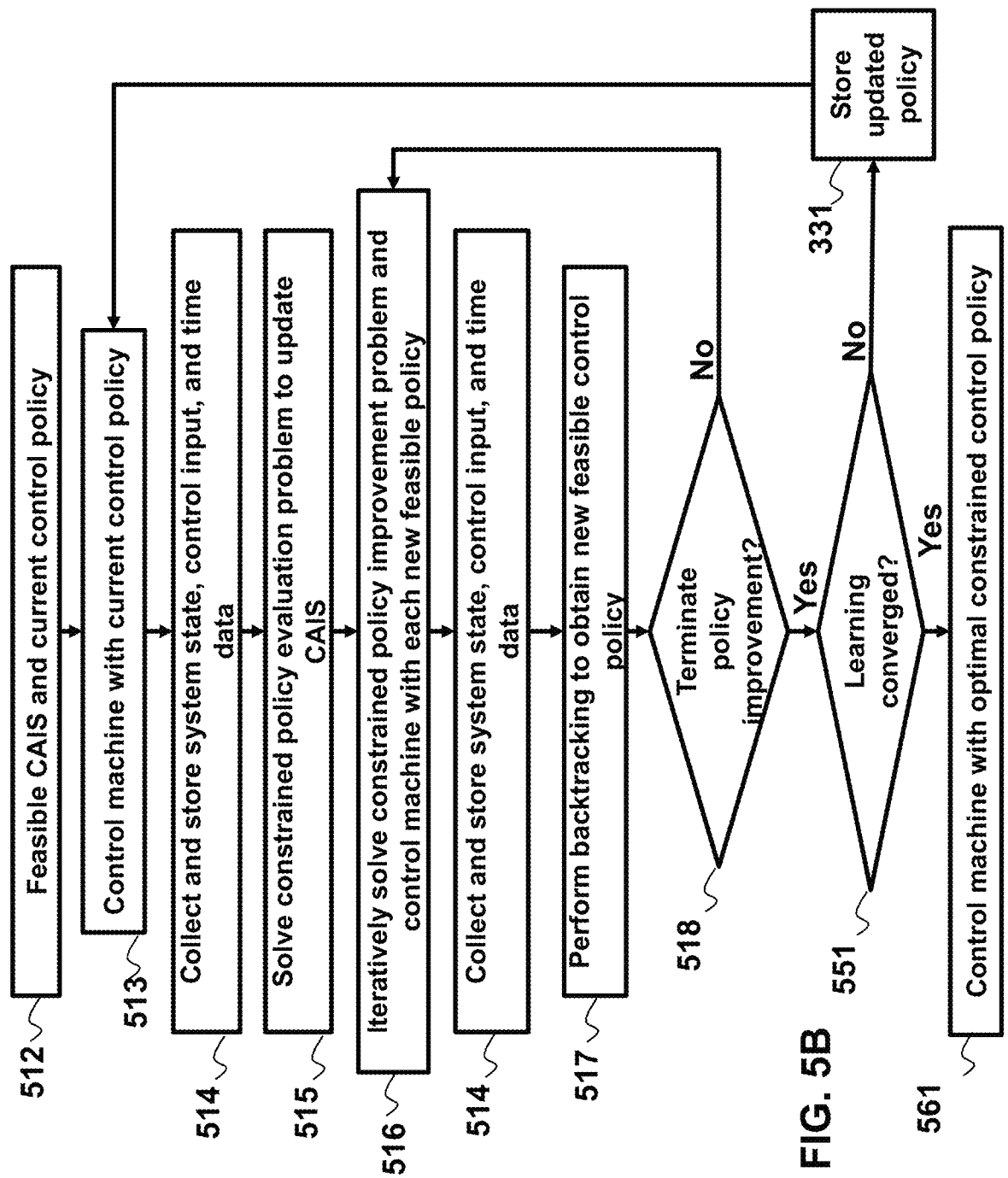

Data-driven (701)

$$\hat{P}_{t+1}, \rho_{t+1} := \arg\min_{\rho, P} \frac{1}{2} \sum_{t=t_i}^{t_i+l-1} (\tilde{\mathcal{J}}_t(P))^2 - \lambda_\rho \rho \quad 711$$

subject to:
$$\tilde{x}_{t+1}^\top P \tilde{x}_{t+1} - \lambda \tilde{x}_t^\top P \tilde{x}_t \leq 0$$
$$\tilde{x}_t^\top P \tilde{x}_t \leq \rho$$
$$(c_k^\top + d_k^\top K_t)^\top \rho (c_k^\top + d_k^\top K_t) \preceq P \quad 731$$
$$\alpha_1 \mathbf{I} \preceq P \preceq \alpha_2 \mathbf{I} \quad 741$$
$$\rho > 0,$$
$$\tilde{\mathcal{J}}_t(P) = \tilde{x}_{t+1}^\top P \tilde{x}_{t+1} - \tilde{x}_t^\top P \tilde{x}_t + \tilde{x}_t^\top Q \tilde{x}_t + \tilde{u}_t^\top R \tilde{u}_t \quad 751$$
$$\lambda < \left(\frac{\alpha_1}{\alpha_2}\right)^{2/N} \quad 761$$

Quasi Model-based (702)

$$P_{t+1}, \rho_{t+1} := \arg\min_{P, \rho} \|\mathcal{J}_t(P)\|$$

subject to:
$$(A + BK_t)^\top P(A + BK_t) - \lambda P \preceq 0 \quad 712$$
$$x_t^\top P x_t \leq \rho$$
$$(c_k^\top + d_k^\top K_t)^\top \rho (c_k^\top + d_k^\top K_t) \preceq P \quad 732$$
$$\alpha_1 \mathbf{I} \preceq P \preceq \alpha_2 \mathbf{I} \quad 741$$
$$\rho > 0$$
$$\mathcal{J}_t(P) := (A + BK_t)^\top P(A + BK_t) - P + Q + K_t^\top R K_t \quad 752$$
$$\lambda < \left(\frac{\alpha_1}{\alpha_2}\right)^{2/N} \quad 761$$

FIG. 7

$$H_{t+1} = H_t + \bar{x}_k \bar{x}_k^\top \otimes (R + B^\top \bar{P}_{t+1} B)$$

$$g_{t+1} = \bar{x}_k \otimes (R \bar{K}_t \bar{x}_k + B^\top \bar{P}_{t+1} \bar{x}_k)$$

$$\text{vec}(\bar{K}_{t+1}) = \text{vec}(\bar{K}_t) - \beta_t H_{t+1}^{-1} g_{t+1}$$

Algorithm 1 Constrained Policy Improvement: Backtracking

Input: Desired policy $K_{t+1}^*$ and current constrained policy $K_t$.

1: $K_{t+1} \leftarrow K_{t+1}^*$, $\alpha \leftarrow 1$.
2: while $(c_i^\top + d_i^\top K_{t+1})^\top \rho (c_i^\top + d_i^\top K_{t+1}) \not\preceq P_{t+1}$ do
3: $\quad \alpha \leftarrow \beta \alpha$, where $0 < \beta < 1$.
4: $\quad K_{t+1} \leftarrow K_t + \alpha (K_{t+1}^* - K_t)$.

FIG. 8

Algorithm 2 Data-driven constrained ADP

Input: Initial policy $\bar{K}_0$ and CAIS $\mathcal{E}_{P_0}^\ell$ (see Assumption 2), initial state value $\bar{x}_0$ and $\epsilon > 0$.

1: $D \leftarrow \{\}$.
2: for $t = 0, 1, \ldots$ do
3:    Apply control input $\bar{u}_t = v_t + \bar{K}_t \bar{x}_t$.    ▷ to system
4:    Obtain new state estimate $\bar{x}_{t+1}$.    ▷ from system
5:    if $\|g_t\| \leq \epsilon$ then:    ▷ convergence check
6:       $D \leftarrow \{D, t\}$.    ▷ add data time stamp
   /* Policy evaluation step (SDP) */
7:    if PE condition holds with data $\forall t \in D$ then:
8:       Compute $\rho^+, P^+$ by solving SDP (23) based on stored buffer of data points $\{\bar{x}_t, \bar{u}_t, \bar{K}_t, \bar{x}_{t+1}\}_{t \in D}$.
9:       $\bar{P}_{t+1}, \rho_{t+1} \leftarrow P^+, \rho^+$.    ▷ define new ellipsoid
10:      Reset buffer $D \leftarrow \{\}$.
11:    else
12:      $\bar{P}_{t+1}, \rho_{t+1} \leftarrow \bar{P}_t, \rho_t$.
   /* Policy improvement step (RLS) */
13:    Compute new policy $\bar{K}_{t+1}$ as in (25), using Alg. 1, given new measurements $(\bar{x}_t, \bar{u}_t, \bar{K}_t, \bar{x}_{t+1})$ and $\bar{P}_{t+1}$.

FIG. 9

SYSTEM AND METHOD FOR DATA-DRIVEN CONTROL OF CONSTRAINED SYSTEM

TECHNICAL FIELD

The invention relates generally to system control, and more particularly to methods and apparatus for model-free control of a constrained machine.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites and power generators. However, in a number of situations, an analytical model of a controlled system is unavailable, difficult to update in real-time, or inaccurate. Examples of such cases are prevalent in robotics, building control (HVAC), vehicles, smart grids, factory automation, transportation, self-tuning machines, and traffic networks.

In the absence of accurate models of dynamical systems, some control methods exploit operational data generated by these systems in order to construct feedback control policies that stabilize the system dynamics, or embed quantifiable control-relevant performance. The use of data to design control policies is called data-driven control. There are two kinds of data-driven control methods: indirect methods that first construct a model of the system and then leverage the model to design controllers, or direct methods that directly construct control policies from data without the intermediate model-building step. A drawback of indirect methods is the potential requirement of large quantities of data in the model-building phase. Conversely, direct methods require less data. However, even cutting-edge direct control methods experience difficulties in handling state and input constraints that are imperative for maintaining safe operation in closed-loop control systems.

For example, reinforcement learning (RL) is an area of machine learning concerned with how to take actions in an environment so as to maximize some notion of cumulative reward (or equivalently, minimize a cumulative loss/cost). Reinforcement learning is closely related with optimal control in continuous state-input spaces, which is concerned mostly with the existence and characterization of optimal control policies, and algorithms for their computation in the absence of a mathematical model of the controlled system and/or environment.

However, current RL methods are not suitable for data-driven control of constrained systems. This is because the conventional RL methods do not consider state and input constraint satisfaction in continuous state-action spaces; that is, conventional RL cannot guarantee that the states of the controlled system operated with control inputs satisfy state and input constraints throughout the operation. A problem of conventional RL is that during an exploration stage, the RL perturbs the system with different inputs to learn the states corresponding to the control inputs. Moreover, to better learn a system, it is beneficial to use control inputs approaching physical boundaries of possible constraints. Because there is no model, there is no guarantee that arbitrarily selected control inputs and/or boundary-valued control inputs will not direct the system state to an area outside the specified state constraint set, thereby resulting in the violation of state constraints.

Accordingly, there is a need for a system and a method for model-free/data-driven control of a system subject to state and control input constraints define in continuous space.

SUMMARY

It is an object of some embodiments to provide a system and a method for model-free data-driven control of a machine subject to state and control input constraints. Additionally or alternatively, it is an object of some embodiments to provide such a method that extend some principles of reinforcement learning (RL) to guarantee satisfaction of the state constraints in continuous state space of the system and/or to guarantee satisfaction of control input constraints in continuous control input space.

Some embodiments are based on recognition that a control problem for controlling an operation of a machine subject to state constraints in continuous state space of the machine and subject to control input constraints in continuous control input space of the machine can be formulated as a control problem of a machine having a state within a constraint admissible invariant set (CAIS) of the states of the machine satisfying the state constraints. The CAIS is coupled to, or associated with, a corresponding control policy that guarantees that when a machine is in the CAIS and is controlled according to this control policy, the state of the machine is maintained with the CAIS, and therefore, such a control always satisfies the constraints. However, the CAIS is usually determined based on a model of the machine, and based on our knowledge there is no method that can determine CAIS based on data obtained online by observing operations of the machine.

Some embodiments are based on recognition that if a state of a machine is in any arbitrarily and suboptimal CAIS associated with any arbitrarily suboptimal control policy and that arbitrarily and suboptimal CAIS satisfies the state constraints, it is safe to control the machine with this suboptimal control policy without the danger of violating the constraints. Some embodiments are based on realization that the data collected during such suboptimal control can be used to improve suboptimal CAIS and suboptimal control policy. Moreover, some embodiments are based on realization supported by experiments and mathematical prove that iterative update of such a suboptimal, but safe control using some RL principles will asymptotically converge to an optimal control policy for control of a constrained machine without violating the constraints of the machine and without the need for knowledge of a dynamical model of the machine.

Specifically, some embodiments are based on recognition that value function and control policy update of RL methods for linear machines includes iterative solution via a policy and/or value iteration method. Such a solution can be used to update the value function estimate and improve the control policy using data collected during control of a machine. In addition, some embodiments are based on realization that such a policy iteration can be modified based on constraints on the controlled machine to require the solution of an optimization problem related to the controlled performance of the machine to satisfy the constraints on the states and control inputs. The policy iteration subject to constraints is referred herein as constrained policy iteration. That constrained policy iteration can also be solved iteratively using data collected during a safe control with suboptimal control policy associated with suboptimal CAIS and the solution of the constrained policy iteration can also be used to improve the suboptimal CAIS and the suboptimal control policy. The improved control policy and improved CAIS can further be used for safe control of the machine and the data collected from that improved control can further improve the control policy and the CAIS. As a result, iterative control of the machine with suboptimal control policy associated with suboptimal CAIS and update of the suboptimal control policy and suboptimal CAIS based on the collected data by solving the constrained policy iteration ultimately produces the optimal control policy and optimal CAIS in a guaranteed safe manner.

To that end, some embodiments, starting with suboptimal CAIS and control policy, jointly control the machine and update the CAIS and the control policy. For example, for performing the joint control and update, some embodiments control the machine using the control policy to collect data including a sequence of control inputs generated using the control policy and a sequence of states of the machine within the CAIS corresponding to the sequence of control inputs, and update the CAIS, the value function, and the control policy by solving a constrained policy iteration using the collected data. The constraints on the policy iteration are functions of the state constraints and the control input constraints.

One embodiment is configured to repeat the joint control and update until a termination condition is met. Example of terminal condition can be the end of the control. Additionally, or alternatively, one embodiment upon reaching a termination condition produces an optimal control policy, and after that controls the machine using the optimal control policy.

Accordingly, one embodiment discloses an apparatus for controlling an operation of a machine subject to state constraints in continuous state space of the system and subject to control input constraints in continuous control input space of the system. The apparatus includes a memory configured to store a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS; an input interface to accept data indicative of the state of the system; and a processor configured to jointly control the machine and update the CAIS and the control policy, wherein, for performing the joint control and update, the processor is configured to control the system using the control policy to collect data including a sequence of control inputs generated using the control policy and a sequence of states of the system within the CAIS corresponding to the sequence of control inputs; and perform a constrained policy iteration using the collected data to update the CAIS and the corresponding control policy, wherein, to perform the constrained policy iteration, the processor is configured to perform a constrained policy evaluation to produce an updated CAIS and a corresponding updated value function of state of the system, wherein the updated value function improves a cost function of the operation of the machine and the updated CAIS enforces satisfaction of the state and control input constraints; and perform a constrained policy improvement to produce an updated control policy that improves the cost function of operation according to the updated CAIS and the corresponding updated value function.

Another embodiment discloses a method for controlling an operation of a machine subject to state constraints in continuous state space of the system and subject to control input constraints in continuous control input space of the system, wherein the method uses a processor coupled to a memory storing a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS, wherein the processor is coupled with stored instructions implementing the method, wherein the instructions, when executed by the processor carry out at least some steps of the method, including accepting data indicative of the state of the system; and controlling the system using the control policy to collect data including a sequence of control inputs generated using the control policy and a sequence of states of the system within the CAIS corresponding to the sequence of control inputs; and performing a constrained policy iteration using the collected data to update the CAIS and the corresponding control policy, wherein the constrained policy iteration includes performing a constrained policy evaluation to produce an updated CAIS and a corresponding updated value function of state of the system, wherein the updated value function improves a cost function of the operation of the machine and the updated CAIS enforces satisfaction of the state and control input constraints; and performing a constrained policy improvement to produce an updated control policy that improves the cost function of operation according to the updated CAIS and the corresponding updated value function.

Yet another embodiment discloses a non-transitory computer readable storage medium embodied thereon a program executable by a processor for performing a method, wherein the medium stores a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS, the method includes accepting data indicative of the state of the system; and controlling the system using the control policy to collect data including a sequence of control inputs generated using the control policy and a sequence of states of the system within the CAIS corresponding to the sequence of control inputs; and performing a constrained policy iteration using the collected data to update the CAIS and the corresponding control policy, wherein the constrained policy iteration includes performing a constrained policy evaluation to produce an updated CAIS and a corresponding updated value function of state of the system, wherein the updated value function improves a cost function of the operation of the machine and the updated CAIS enforces satisfaction of the state and control input constraints; and performing a constrained policy improvement to produce an updated control policy that improves the cost function of operation according to the updated CAIS and the corresponding updated value function.

BRIEF DESCRIPTION OF THE DRAWINGS

FIG. 5B is a flowchart that details the key steps of updating the CAIS and the control policy in a sequential manner using data, according to some embodiments;

FIG. 7 is a description of the constrained policy evaluation step for updating the CAIS via a semi-definite program with a comparison of model-based and data-driven approaches, according to some embodiments;

FIG. 8 is a pseudo-code describing iterative policy improvement via recursive least squares with backtracking, according to one embodiment;

FIG. 9 is a pseudo-code for data-driven constrained policy iteration, according to some embodiments;

DETAILED DESCRIPTION

It is an object of some embodiments to provide a system and a method for controlling an operation of a machine using a data-driven state feedback optimal controller. It is another object of some embodiments to provide such a controller that is suitable for controlling a machine subject to constraints. An example of such a data-driven optimal controller uses constrained approximate dynamic programming (ADP) to determine constrained control policies based on data obtained during the operation of the controlled machine. The ADP based adaptive control performs iteratively. For simplicity of presentation, this disclosure discusses methodology within one iteration, which can be repeated as long as necessary for the control application.

Figure 1:
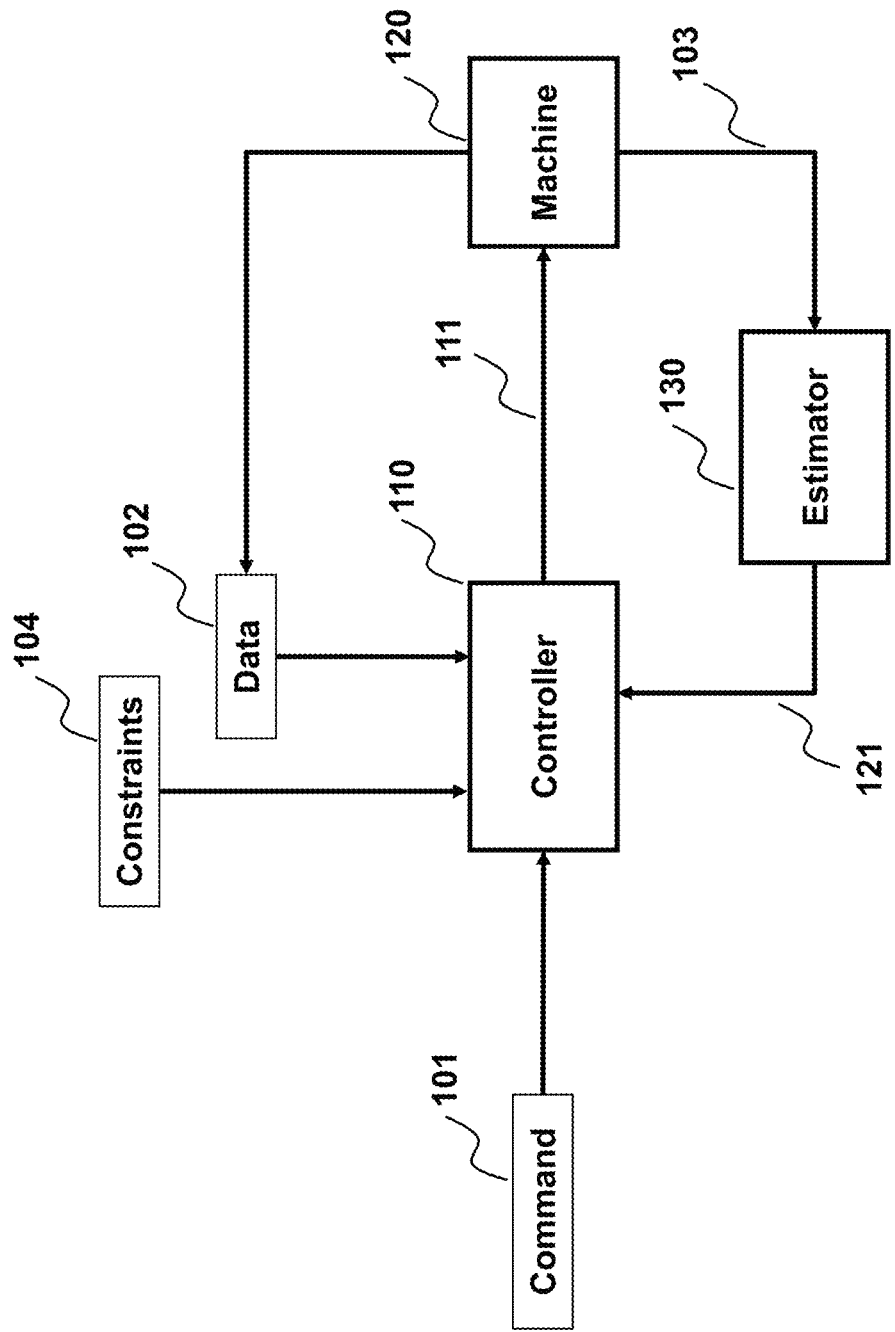
FIG. 1 is a block diagram of a data-driven constrained controller and feedback system, according to some embodiments of the invention.

FIG. 1 shows an example of a controlled machine, such as a machine 120, controlled by a data-driven controller 110 according to some embodiments. In some implementations, the data-driven controller uses a reinforcement learning methodology that performs approximate dynamic programming according to data 102 obtained during the operation of the machine 120. The controller includes an input interface to accept the data 102 indicative of the state of the machine. Examples of the input interface includes network control interface configured to accept data transmitted thorough wired or wireless communication channel. The data 102 can include state 121, output 103, and/or control input 111 obtained at the current time or stored from previous times, as well as previous and current constraint-admissible invariant set (CAIS) with previous and current control policy.

The state 121 can include the measurements 103 as well as transformations of the measurements performed by a state-estimator 130. Examples of state estimator includes: the identity function I(x)=x, in systems when the full-state feedback is available, or approximate differentiators with low-pass filters to estimate the derivatives of the output, from which a state estimate can be obtained for systems where the states are derivatives of the output; as an example, consider an output of system position, where states are positions, velocities, and acceleration (derivatives of position).

The machine and control system is designed to satisfy constraints 104 that arise from safety considerations, physical limitations, and/or specifications, limiting the range where the outputs, the inputs, and also possibly the states of the machine are allowed to operate. The constraints 104 are defined in continuous space. For example, state constraints are defined in continuous state space of the machine and control input constraints are defined in continuous control input space.

During the operation, the controller receives a command 101 indicating the desired behavior of the machine. The command can include, for example, a value of the desired torque generated by the machine. In response to receiving the command 101, the controller generates a control signal 111 that serves as a control input for the machine 120. In response to the input 111, the machine updates the output 103 of the machine. Based on measurements of the output 103 of the machine, the estimator 130 updates the estimated state 121 of the machine. This estimated state 121 of the machine provides the state-feedback to the controller 110.

The machine 120, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine 120 can be modeled by a set of equations representing changes of the output over time as functions of current and previous inputs and previous outputs. During the operation, the machine can be defined by a state of the machine. The state of the machine is any set of information, in general time varying, that together with the model and future inputs, can define future motion. For example, the state of the machine can include an appropriate subset of current and past inputs and outputs.

The controller 110 can be implemented in hardware or as a software program executed in a processor, e.g., a microprocessor, which at fixed or variable control period sampling intervals receives the estimated state 121 of the machine 120 and the desired motion command 101 and determines, using this information, the inputs, e.g., the control signal 111, for operating the machine. The estimator 130 can be implemented in hardware or as a software program executed in a processor, either the same or a different processor from the controller 110, which at fixed or variable control period sampling intervals receives the outputs 103 of the machine and determines, using the new and the previous output measurements, the estimated state 121 of the machine.

Figure 2A:
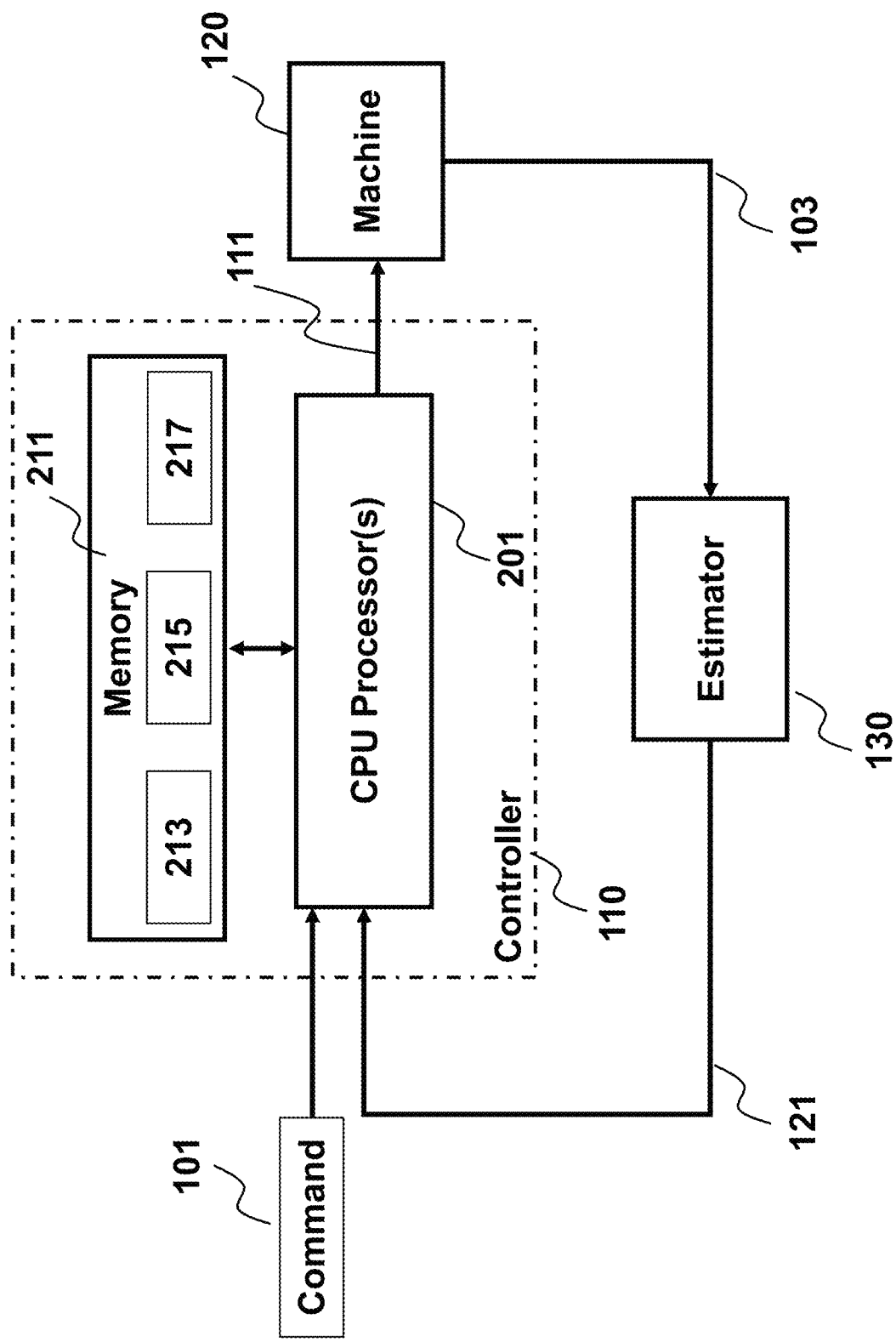
FIG. 2A is a block diagram of a data-driven controller, implemented using CPU processor(s) and memory, and a feedback system, according to some embodiments.

FIG. 2A shows a block diagram of a controller according to some embodiments. The controller 110 actuates the machine 120 such that the estimated state 121 of the machine 120 and output 103 follow a command 101. The controller 110 includes or operated by a computer, e.g., in the form of a single central processing unit (CPU) or multiple CPU processors 201 connected to memory 211 for storing the constraints 213 and the data 215 on the operation of the machine. The memory 211 is also configured to store 217 a constraint admissible invariant set (CAIS) of states of the machine satisfying the state constraints and a corresponding control policy mapping a state of the machine within the CAIS to a control input satisfying the control input constraints, such that a control of the machine having the state within the CAIS according to the corresponding control policy maintains the state of the machine within the CAIS.

Some embodiments consider a dynamical machine $$x_{t+1} = Ax_t + Bu_t, \quad (1)$$

where $t \in \mathbb{R}$ is the time index, $x \in \mathbb{X} \subset \mathbb{R}^n$ is the state of the machine, $u \in \mathbb{U} \subset \mathbb{R}^m$ is the control input, and $x_{t_0}$ is a known initial state of the machine. In some embodiments, the constraint sets $\mathbb{X}$ and $\mathbb{U}$ are convex, compact, and contain the origin in their interiors. The matrix A represents the state matrix of the controlled machine, while the matrix B represents the actuation/input matrix. The state matrix relates the state update to the current state only, and the input matrix relates the state update to the current control input only; concurrently they describe the whole machine, as in equation (1). The matrix A is unknown, and B is known. For example, in a motor drive machine a model of the motor dynamics A may be unknown, whereas the knowledge that control occurs through the voltage channels B is known.

The objective of ADP is to compute an optimal control policy $K_\infty$ such that the state-feedback controller $u = K_\infty x$ stabilizes the partially known machine (1) while minimizing a cost functional $$V = \sum_{t=0}^{\infty} x_t^T Q x_t + u_t^T R u_t \quad (2)$$

where $Q \succcurlyeq 0$ and $R \succ 0$ are user-defined symmetric matrices, with the pair $(A, Q^{1/2})$ being observable. Optimal control theory states that minimizing a value function given by $V_t(x_t, u_t) = \sum_{k=t}^{\infty} x_k^T Q x_k + u_k^T R u_k$ yields an optimal control action for each time instant $t \geq t_0$, and for discrete-time linear machines such as (1) above, this is equivalent to finding a positive definite symmetric matrix $P_\infty$ such that the discrete-time algebraic Riccati equation (DARE)

$$A^T P_\infty A - P_\infty + Q - A^T P_\infty B (R + B^T P_\infty B)^{-1} B^T P_\infty A = 0 \quad (3)$$

is solved. Upon solving for $P_\infty$, the optimal unconstrained discrete-time optimal control policy is given by $$K_\infty = -(R + B^T P_\infty B)^{-1} B^T P_\infty A. \quad (4)$$

Since A is unknown, it is impractical to directly compute $P_\infty$ or $K_\infty$ from (3) and (4). Instead, ADP can be used to learn the optimal policy iteratively, using on-line data without knowing a full model of the machine. ADP techniques include policy iteration (PI) and value iteration (VI). At the tth iteration, unconstrained PI methods use the value function matrix Pt and current control policy $K_t$ iteratively to solve the policy evaluation step $$(A + BK_t)^T P_{t+1}(A + BK_t) - P_{t+1} + Q + K_t^T R K_t = 0 \quad (5)$$

and the policy improvement step $$K_{t+1} = -(R + B^T P_{t+1} B)^{-1} B^T P_{t+1} A. \quad (6)$$

to generate a sequence of control policies $\{K_t\}_0^\infty$ that converge asymptotically to the true optimal control policy $K_\infty$ in the absence of constraints. Due to the similarity between PI and value iteration (VI), this disclosure focuses on PI methods, but skilled artisan would readily recognize the extensions of some embodiments to VI methods in the absence of constraints. A skilled artisan would also be readily able to implement the unconstrained policy iteration steps (5) and (6) in a data-driven manner. However, in contrast with unconstrained policy iterations, enforcing constraints into PI methods is notoriously difficult in continuous state and control inputs spaces, and is the subject of this disclosure.

To that end, some embodiments use a constrained policy iteration method that enforces state and input constraints at the current and future time-steps. The constrained policy iteration is a combination of constrained policy evaluation and constrained policy improvement. Constrained policy evaluation includes updating the value function, e.g., by optimizing the value function matrix $P_t$ at the current time t, while satisfying state and control input constraints, using only the measurement data obtained in prior time-steps.

Some embodiments perform a constrained policy evaluation to produce an updated CAIS and a corresponding updated value function of state of the machine, wherein the updated value function improves a cost function of the operation of the machine and the updated CAIS enforces satisfaction of the state and control input constraints. In contrast with an unconstrained policy evaluation, the constrained policy evaluation aims to satisfy the constrains and also aims to determine and/or improve the CAIS, such that the subsequent constrained policy improvement can improve the control policy in consideration of the updated CAIS.

Some embodiments, are based on realization that to while the improvement of the value function can be judged from the point of view of the cost of operation of the machine, the improvement of the CAIS can be judged from a point of view of a size of the CAIS. In other words, some embodiments aim to iteratively increase the size of the CAIS.

To that end, in some embodiments, the constrained policy evaluation performs a multi-objective optimization to minimize the cost function of the operation of the machine and to maximize a size metric of the updated CAIS to produce the updated CAIS and the corresponding updated value function. In such a manner, the improved, e.g., increased, CAIS allows to increase convergence of the control policy to the optimal control while controlling the machine having its state within the CAIS to guarantee the satisfaction of the constraints.

In addition, constrained policy improvement includes obtaining a constraint-admissible control policy that optimizes the updated value function obtained in the constrained policy evaluation step. Some embodiments perform a constrained policy improvement to produce an updated control policy that improves the cost function of operation according to the updated CAIS and the corresponding updated value function. For example, some embodiments are ensuring that the updated control policy is linear and satisfies a matrix inequality that depends on the updated CAIS.

Figure 2B:
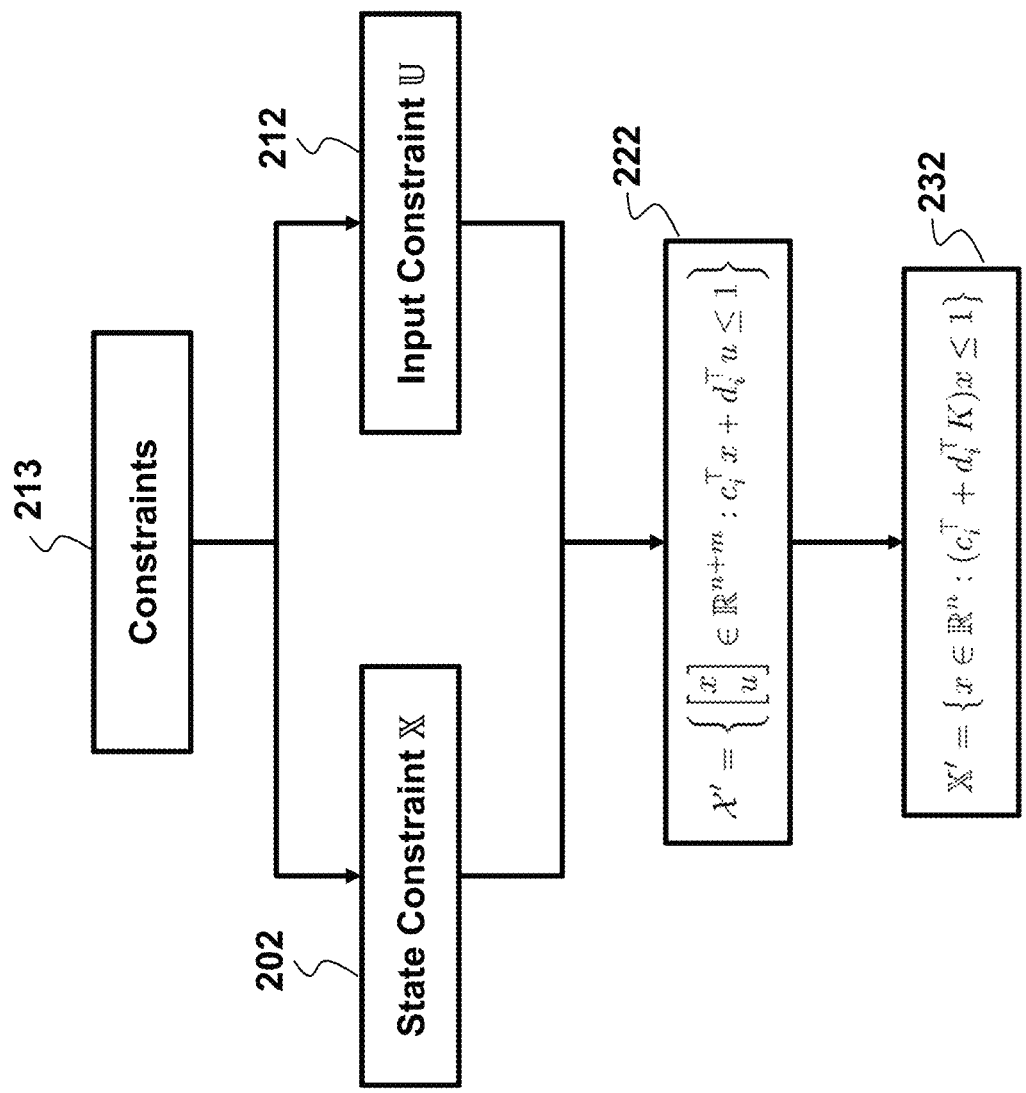
FIG. 2B is a schematic of state and control input constraints defined for the machine and a mathematical description of these constraints, according to some embodiments.

FIG. 2B shows a schematic of the constraints 213 enforced by a controller according to some embodiments. The constraints 213 includes state constraints $\mathbb{X}$ defined in continuous space of the state of the machine 120 and control input constraints $\mathbb{U}$ defined in continuous space of the control inputs to the machine 120. Exemplar constraints 213 can be represented by polytopic sets 222. With any fixed linear control policy u=Kx, the polytopic constraint set 222 is represented using the compact representation 232. In the representations 222 and 232, setting $c_i=0$ implies that the ith constraint is a constraint on the control input only, and setting $d_i=0$ implies that the ith constraint is a constraint on the machine state only. In one exemplar embodiment, the constraints 213 include both the state and the control input constraints.

Figure 3:
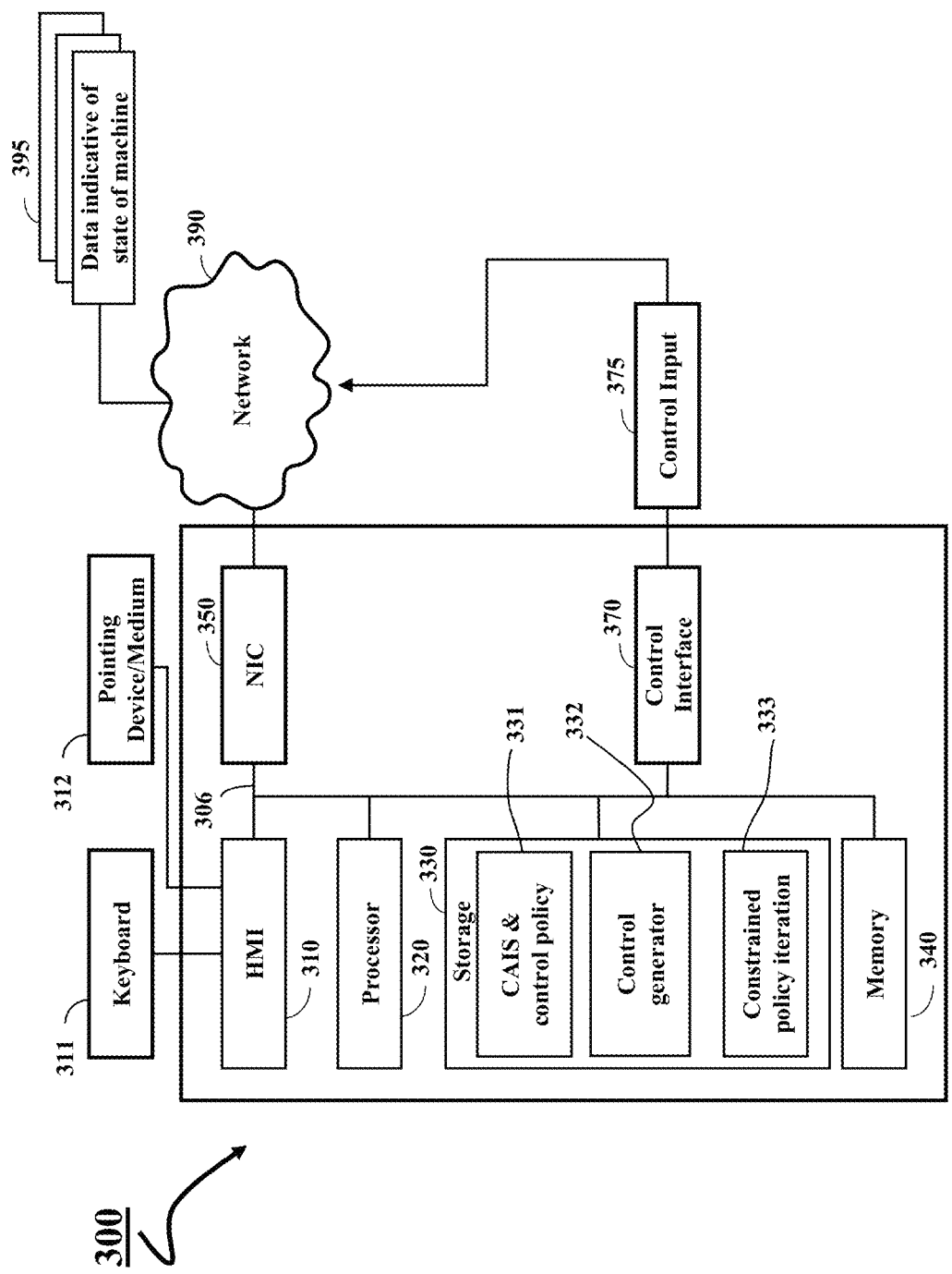
FIG. 3 is a schematic describing how to obtain initial constraint-admissible invariant set (CAIS) corresponding to initial feasible control policies using legacy data, according to some embodiments.

FIG. 3 shows a block diagram of a controller 300 for controlling a machine subject to state constraints in continuous state space of the machine and subject to control input constraints in continuous control input space of the machine in accordance with some embodiments. The controller 300 can have a number of interfaces connecting the machine 300 with other machines and devices. A network interface controller 350 is adapted to connect the controller 300 through the bus 306 to a network 390 connecting the controller 300 with the controlled machine 120. To that end, the controller includes an output interface, e.g., a control interface 370, configured to submit the sequence of control inputs 375 to the machine 120 through the network 390 and includes an input interface, e.g., a network interface controller (NIC) 350 configured to accept through the network 390 the data 395 indicative of the state of the machine 120. The controller 300 can also include other types of input and output interfaces. For example, the controller 300 can include a human machine interface 310. The human machine interface 310 can connect the controller 300 to a keyboard 311 and pointing device 312, wherein the pointing device 312 can include a mouse, trackball, touchpad, joy stick, pointing stick, stylus, or touchscreen, among others.

The controller 300 includes a processor 320 configured to execute stored instructions, as well as a memory 340 that stores instructions that are executable by the processor. The processor 320 can be a single core processor, a multi-core processor, a computing cluster, or any number of other configurations. The memory 340 can include random access memory (RAM), read only memory (ROM), flash memory, or any other suitable memory machines. The processor 320 can be connected through the bus 306 to one or more input and output devices.

The processor 320 is operatively connected to a memory storage 330 storing the instruction as well as processing data used by the instructions. The storage 330 can form a part of or be operatively connected to the memory 340. For example, the memory storage can store the state constraints and the input constraints for the machine 120. Additionally or alternatively, the memory storage is configured to store a CAIS of states of the machine satisfying the state constraints and a corresponding control policy mapping a state of the machine within the CAIS to a control input satisfying the control input constraints 331. As used herein, a control of the machine having the state within the CAIS according to the corresponding control policy maintains the state of the machine within the CAIS.

The processor 320 is configured to jointly control the machine and update the CAIS and the control policy. To that end, for performing the joint control and update, the processor is configured to execute a control generator 332 to control the machine using the control policy 331 to collect data including a sequence of control inputs 375 generated using the control policy 331 and a sequence of states 395 of the machine within the CAIS corresponding to the sequence of control inputs; and execute a constrained policy iteration solver 333 to update the CAIS and the control policy subject to the state constraints and the input constraints.

Some embodiments are based on recognition that if a state of a machine is in any arbitrarily and suboptimal CAIS associated with any arbitrarily suboptimal control policy and that arbitrarily and suboptimal CAIS satisfies the state constraints, it is safe to control the machine with this suboptimal control policy without the danger of violating the constraints. Some embodiments are based on realization that the data collected during such suboptimal control can be used to improve suboptimal CAIS and suboptimal control policy. Moreover, some embodiments are based on realization supported by experiments and mathematical prove that iterative update of such a suboptimal, but safe control using some RL principles asymptotically converges to an optimal control policy for control of a constrained machine without violating the constraints of the machine and without the need for knowledge of a dynamical model of the machine.

Specifically, some embodiments are based on recognition that policy update of RL methods for linear systems using policy iteration includes iterative solution of an algebraic Riccati equation (ARE). Such a solution can be used to improve the control policy and can be found from data collected during a control of a machine. In addition, some embodiments are based on realization that such an ARE can be modified based on constraints on the controlled machine to require the solution of an ARE subject to constraints that relate to state and input constraints. The ARE subject to constraints is referred herein as a constrained ARE and the policy iteration method that are using the constrained ARE is referred as constrained policy iteration. That constrained ARE can also be solved 333 iteratively using data collected during a safe control 332 with suboptimal control policy associated with suboptimal CAIS and the solution of the constrained ARE can also be used to improve the suboptimal CAIS and the suboptimal control policy. The improved control policy and improved CAIS 331 can further be used for safe control of the machine and the data collected from that improved control can further improve the control policy and the CAIS. As a result, iterative control of the machine with suboptimal control policy associated with suboptimal CAIS and update of the suboptimal control policy and suboptimal CAIS based on the collected data by solving the constrained ARE ultimately produces the optimal control policy and optimal CAIS in a guaranteed safe manner.

To that end, some embodiments, starting with suboptimal CAIS and control policy, jointly control the machine and update the CAIS and the control policy. For example, for performing the joint control and update, some embodiments control the machine using the control policy to collect data including a sequence of control inputs generated using the control policy and a sequence of states of the machine within the CAIS corresponding to the sequence of control inputs, and update the CAIS and the control policy by solving a constrained ARE using the collected data. The constraints on the ARE are functions of the state constraints and the control input constraints.

One embodiment is configured to repeat the joint control and update until a termination condition is met. Example of terminal condition can be the end of the control. Additionally, or alternatively, one embodiment upon reaching a termination condition produces an optimal control policy, and after that controls the machine using the optimal control policy.

Figure 4A:
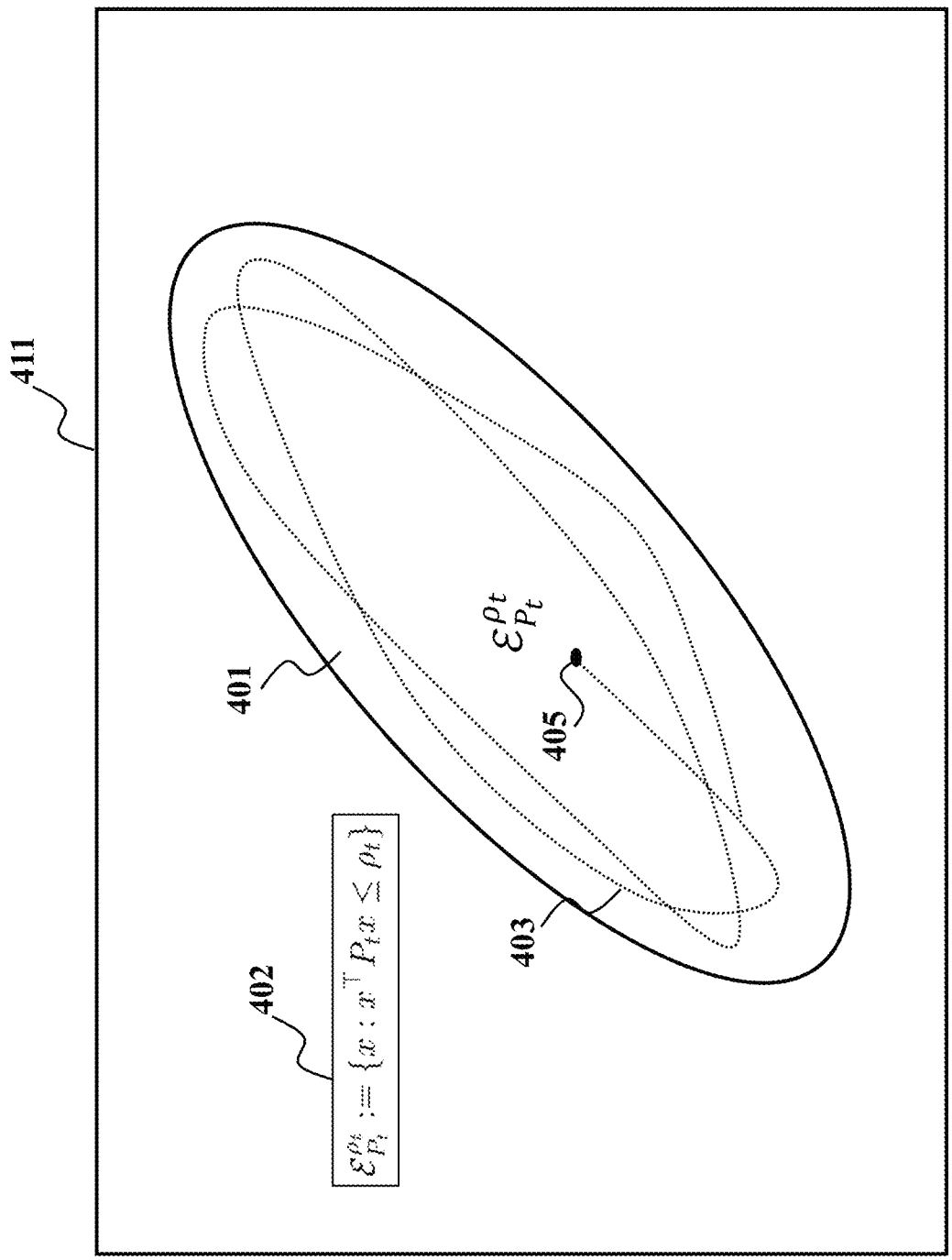
FIGS. 4A and 4B is a schematic that illustrates constraint admissibility using a CAIS, according to some embodiments.

FIG. 4A is a schematic showing principles of CAIS and corresponding control policy used by some embodiments. FIG. 4A shows an example of a CAIS 401 within the admissible state space 411 at time instant t parametrized by $P_t$ and $\rho_t$ in 402. An exemplar closed-loop state trajectory 403 comprising states $x_t, x_{t+1}, x_{t+2}, \ldots$ 395 generated using corresponding control policy providing control input 375 $u_t = K_t x_t$, $u_t+, = K_t x_{t+1}, \ldots$ on the machine. The state trajectory 403 is always confined to the CAIS 401 when the initial state 405 of the trajectory 403 is in the CAIS 401.

Figure 4B:
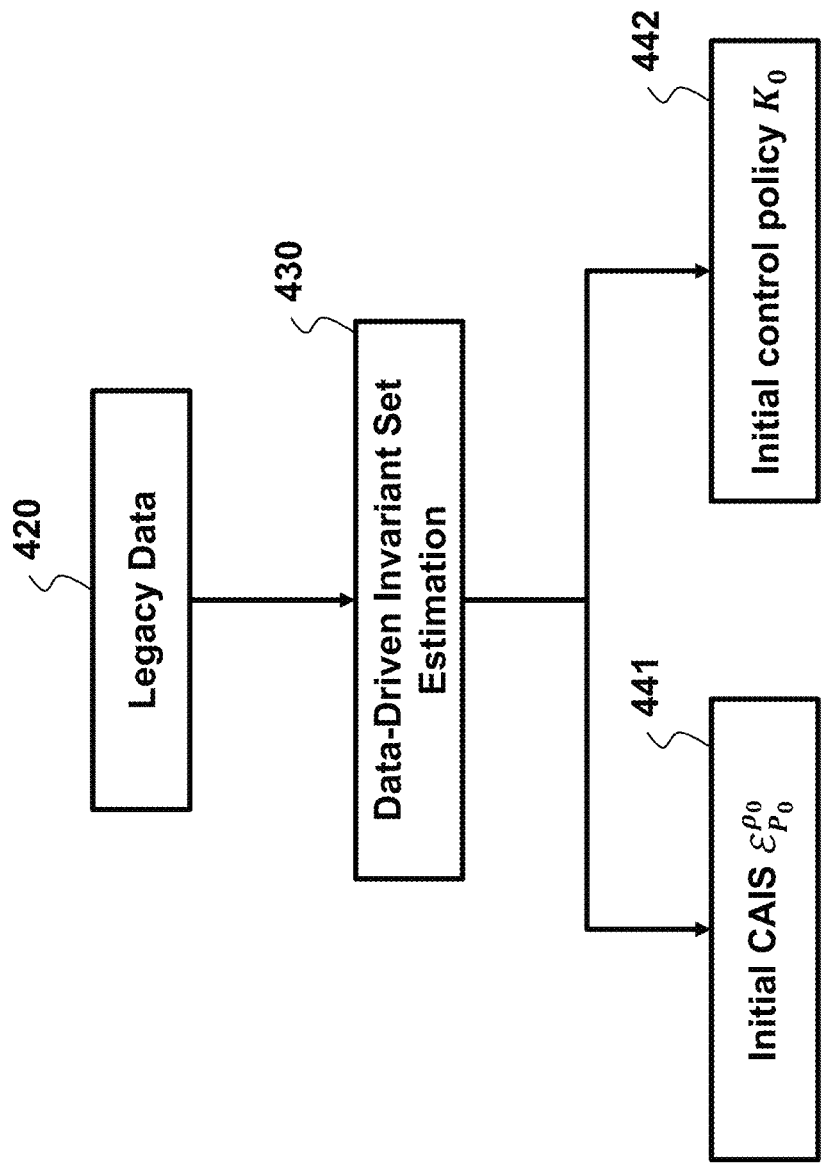

FIG. 4B shows a block diagram of a method for defining an initial CAIS and an initial feasible control policy $K_0$ to be used in constrained policy iteration according to some embodiments. In some implementations, legacy state and control input data 420 obtained from the machine is used along with a data-driven invariant set estimation 430 in order to construct an initial CAIS $\varepsilon_{P_0}^{\rho_0}$ 441. As defined herein a CAIS is a non-empty set within the admissible state constraint space $\mathbb{X}$ for the machine (1) under a control policy $k_0$ 442, such that control inputs are $u = K_0 x$ if and only if, for every initial condition $x_{t_0} \in \varepsilon_{P_0}^{\rho_0}$, all subsequent states $x_t \in \varepsilon_{P_0}^{\rho_0}$ and all subsequent control inputs $K_0 x_t \in \mathbb{U}$ for all subsequent time instants $t \geq t_0$. Examples of legacy data include measurement data from the machine obtained via prior experimentation on the machine in open-loop or closed-loop settings. Examples of prior experimentation include having a human operator testing the machine with small random perturbations and enforcing constraints manually, designing a PID control using only output measurements of the signal after an impulse/step response test, or solving a set of matrix inequalities based on a low quality model of the machine e.g. a linear approximation of a nonlinear system.

Figure 5A:
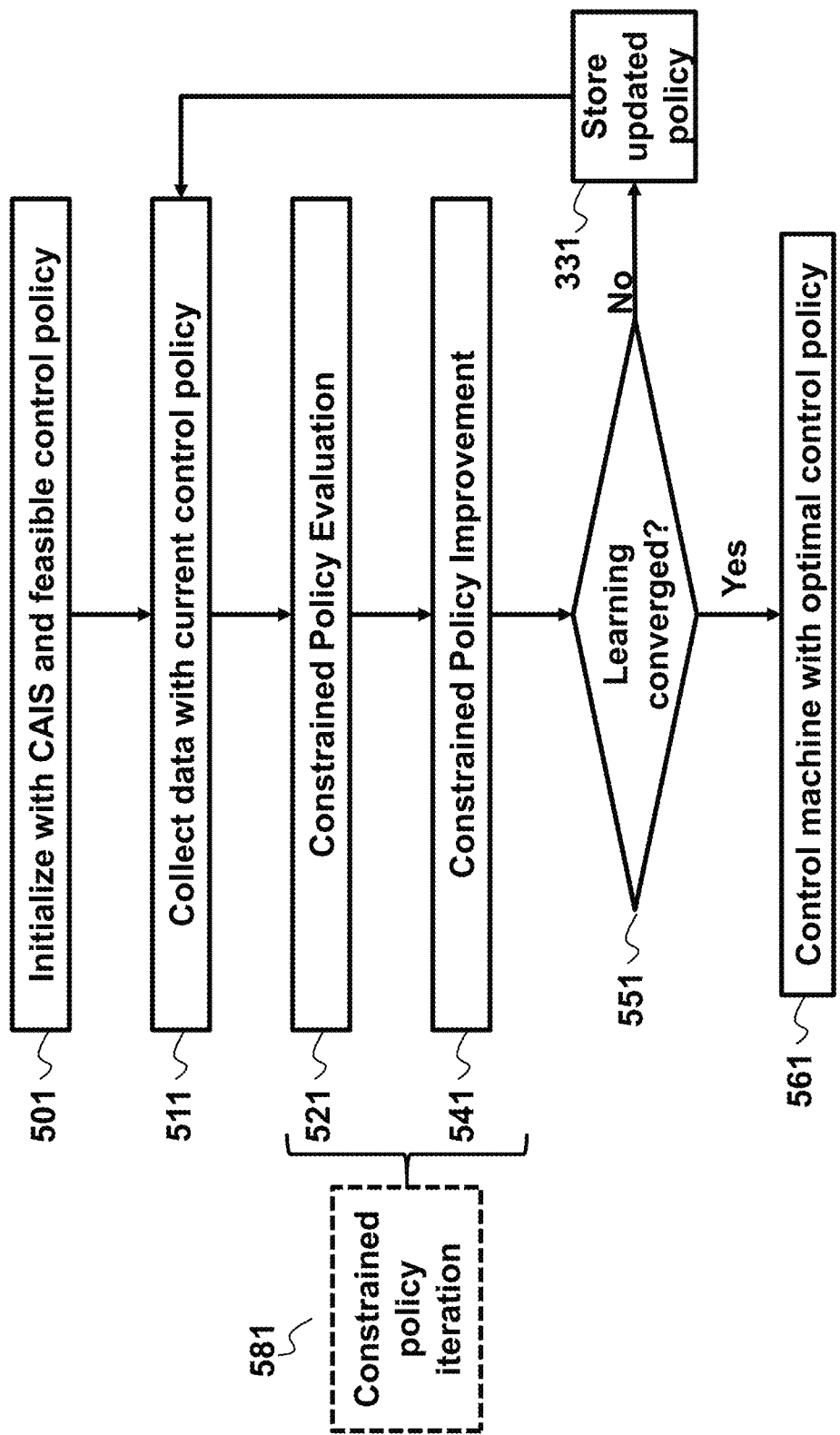
FIG. 5A is a flowchart that illustrates the high-level steps involved in the constrained policy iteration algorithm, according to some embodiments.

FIG. 5A is a block diagram of a constrained policy iteration method used by some embodiments to update the CAIS and find the corresponding constraint-admissible control policy. The method relies on initialization 501 with a CAIS 441 and feasible control policy 442 and consequently collects data 511 during the controlling of the machine with the initial and subsequently updated control policy 442 and an initial state and subsequently changed state, e.g., a state 405, within the initial and subsequently updated CAIS 441. In one embodiment, the initial state may be the state of equilibrium or steady-state of the machine, and the data collected is the sequence of states of the machine and the corresponding sequence of control inputs. Upon collecting data, the CAIS is updated in the constrained policy evaluation 521 and the control policy is updated in the constrained policy improvement 541 and stored in the memory 330. Together, these two steps constitute a constrained policy iteration 581. These steps are performed iteratively until learning convergence and/or termination condition 551 is met. For each subsequent iteration, the data are collected 511 from the machine controlled with the updated control policy stored 331 in the memory. Examples of termination condition include end of the control of the machine and convergence on optimal control policy. If the constrained policy iteration 581 converges on the optimal control policy, upon the convergence, the machine is controlled with the optimal control policy 561.

FIG. 5B illustrates a single learning iteration at the t-th instance of time, according to some embodiments. A feasible CAIS and current control policy 512 are assumed to have been computed in the previous iteration; for the first iteration it would be the initial CAIS 441 and the initial control policy 442. Data is collected 514 by exciting 513 the machine with the current control policy 512. The data is used to solve 515 a constrained policy evaluation problem to update CAIS for which the current control policy is feasible, but not optimal. For example, the constrained policy evaluation performs a multi-objective optimization, wherein the multi-objective optimization optimizes one or combination of the cost function of the operation of the controlled machine, a stability of the controlled machine, and a size metric of the updated CAIS.

Consequently, the current control policy is iteratively updated 516 using the constrained policy improvement to obtain a sequence of control policies that satisfy control input constraints and converge to the optimal control policy for the updated CAIS obtained in 515. The control policy update includes collection of machine measurement data 514 and backtracking to find a feasible control policy 517.

For example, some embodiments are based on recognition that policy evaluation and/or policy improvement can be performed based on finding a solution to an algebraic Riccati equation while ensuring the satisfaction of the state and control inputs constraints. For example, one embodiment performs the policy evaluation to minimize a violation of an algebraic Riccati equation with respect to the value function subject to the state constraints and the input constraints. Additionally or alternatively, one embodiment performs the constrained policy improvement to update the control policy using recursive least squares minimization of a violation of an algebraic Riccati equation with respect to the control policy subject to the state constraints and the input constraints. Additionally or alternatively, some embodiments perform the policy evaluation and improvement jointly to increase the convergence to the optimal control policy.

Figure 5C:
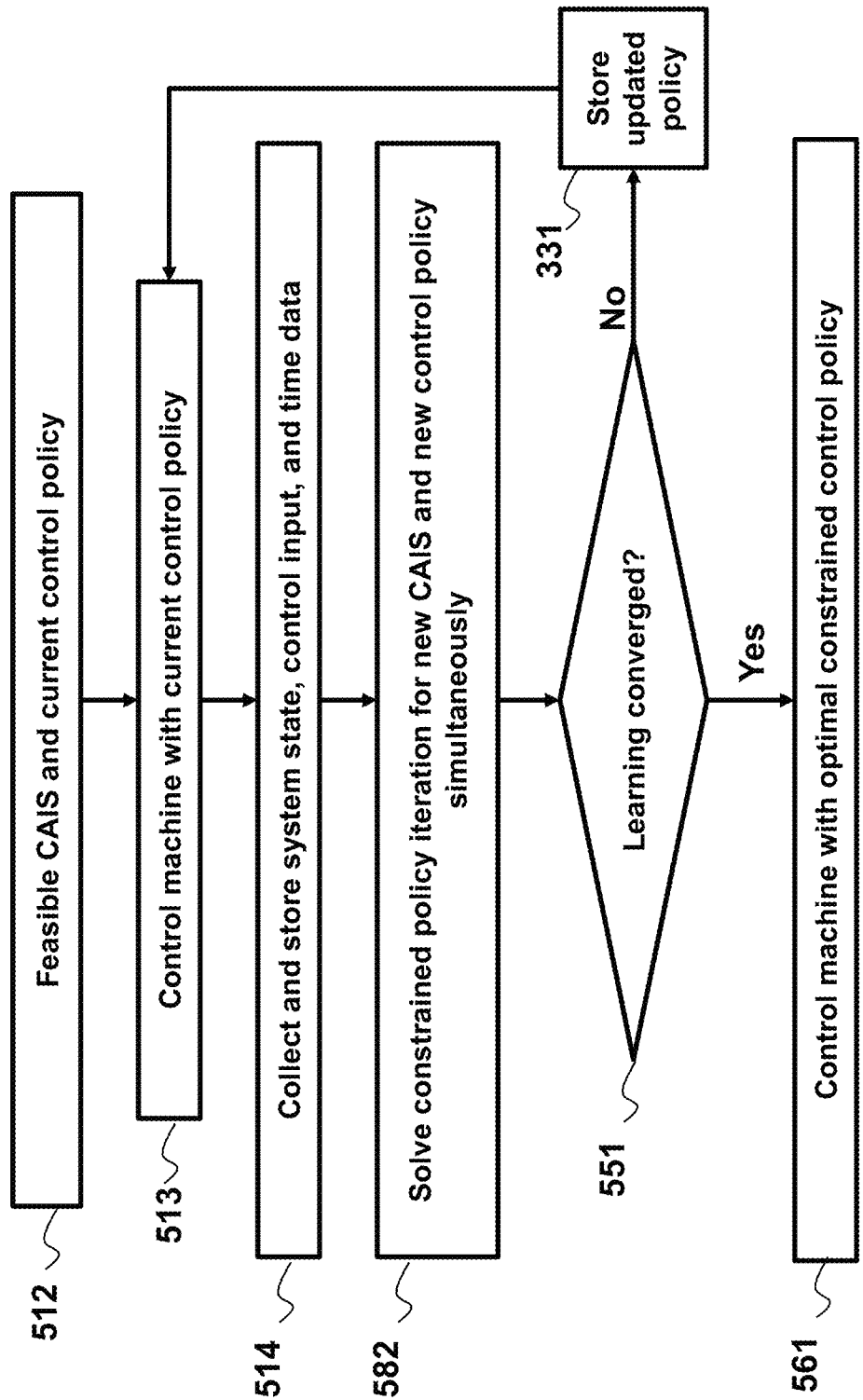
FIG. 5C is a flowchart that details the key steps of updating the CAIS and the control policy in a concurrent manner using data, according to some embodiments.

FIG. 5C shows a block diagram illustrates a single learning iteration at the t-th instance of time, according to some embodiments, where a joint update of CAIS and control policy 582 is performed. In a joint update, the constrained policy evaluation and policy improvement steps are merged and the CAIS update and the control policy update can occur concurrently by solving a single constrained optimization problem. As used herein, joint update is performed to find a solution improving multiple objectives concurrently. Such an joint update can be contrasted with alternative or sequential update of multiple objective, in which one objective is improved first and the second objective is improved for the fixed first objective.

Figure 6:
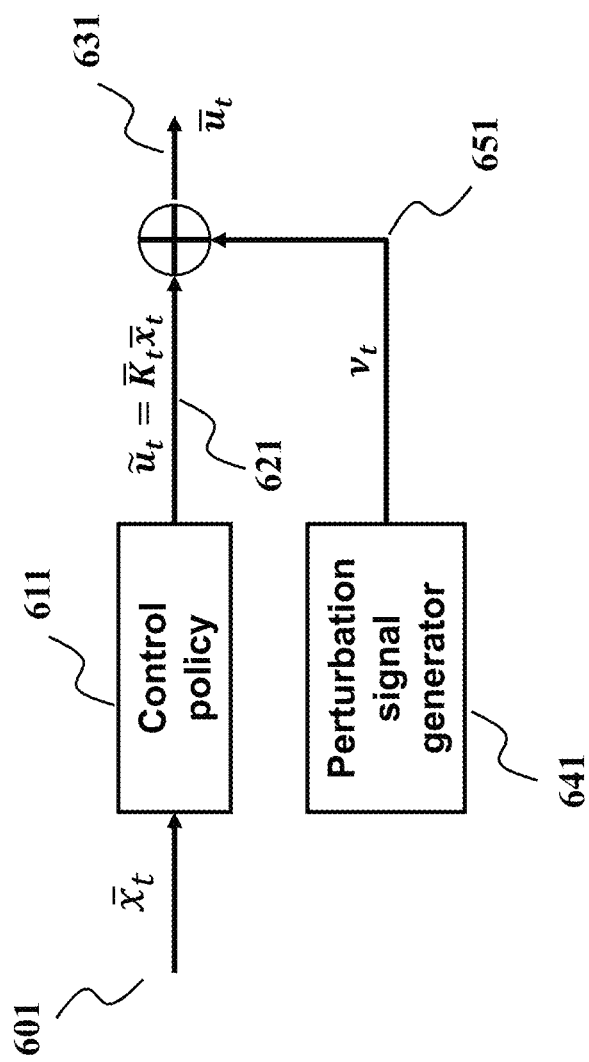
FIG. 6 is a block diagram for adding exploration noise via a perturbation signal generator, according to one embodiment.

FIG. 6 shows a schematic of a method for perturbing a control signal according to one embodiment. The embodiment uses exploration noise to ensure persistence of excitation. For example, the embodiment, for the machine in the state $\tilde{x}_t$ 601, generates a control action $\tilde{u}_t = \overline{K}_t \tilde{x}_t$ 621 via the current control policy 611. A small, randomly generated exploration noise $v_t$ 651 is produced by the perturbation signal generator 641, which is added to the control input 621 to construct the actual control signal $\overline{u}_t$ 631. Given the discrete-time machine dynamics in equation (1), the relation between these quantities is given by $$\overline{x}_{t+1} = A\overline{x}_t + B\overline{u}_t = A\overline{x}_t + B(\overline{K}_t\overline{x}_t + v_t).$$

Consequently, some embodiments define $$\tilde{x}_{t+1} = \overline{x}_{t+1} - Bv_t \text{ and } \tilde{u}_t = \overline{K}_t \tilde{x}_t$$

such that $$\tilde{x}_{t+1} = (A + B\overline{K}_t)\tilde{x}_t.$$

Herein, the small exploratory noise is generated by a signal generator 641 that produces random noise whose distribution has finite support, where the magnitude of this random noise does not exceed the control input value $\tilde{u}_t$. The advantage of the perturbation noise is to ensure that the modes of the machine are persistently excited to improve the learning.

FIG. 7 shows schematic of data-driven constrained policy evaluation addressed by some embodiments. The embodiments solve the data-driven constrained policy evaluation problem for updating the CAIS (for some positive scalars $\alpha_1$ and $\alpha_2$) along with the corresponding equalities/inequalities in quasi "model-based" sense as if the correct matrices A and B of the machine are known, while in reality the matrix A is unknown.

The embodiments perform policy iteration at a discrete-time instances $t_i$, where $$\mathcal{T} = \{t_i\}_{i=0}^{\infty}$$

denotes the set of all policy iteration times. The minimum number of data-points obtain between policy iterations $[t_i, t_{i+1}]$ is given by $$N = \inf_{i \in \mathbb{N}} \{t_{i+1} - t_i \mid t_i, t_{i+1} \in \mathcal{T}\}$$

that is, N denotes the minimum number of data points contained within any learning cycle. For each learning time instant $t_i \in \mathcal{T}$, the embodiments rewrite the discrete-time ARE as $$x_t^T P^+ x_t = x_t^T Q x_t + u_t^T R u_t + x_{t+1}^T P^+ x_{t+1},$$

for every $t \in \{t_i+1, t_i+2, \ldots, t_{i+1}\}$, with $P^+$ representing the updated value function matrix that parameterizes the value function. Having corresponding state and control input data, and known matrices Q and R, the embodiment can rewrite the above equation as $$\Delta_{xx} \text{vec}(P^+) = \begin{bmatrix} x_{t_i+1}^T Q x_{t_i+1} + u_{t_i+1}^T R u_{t_i+1} \\ x_{t_i+2}^T Q x_{t_i+2} + u_{t_i+2}^T R u_{t_i+2} \\ \vdots \\ x_{t_{i+1}}^T Q x_{t_{i+1}} + u_{t_{i+1}}^T R u_{t_{i+1}} \end{bmatrix}$$

where $$\Delta_{xx} = \begin{bmatrix} x_{t_i} \otimes x_{t_i} - x_{t_i+1} \otimes x_{t_i+1} \\ \vdots \\ x_{t_{i+1}} \otimes x_{t_{i+1}} - x_{t_{i+1}+1} \otimes x_{t_{i+1}+1} \end{bmatrix},$$

and $\otimes$ denotes the Kronecker product.

In some embodiments, the constrained policy evaluation generates the updated CAIS and the corresponding updated value function jointly allowing the updated CAIS to be a geometrical transformation of the current CAIS, wherein the geometrical transformation includes one or combination of expansion, contraction, and rotation of the current CAIS. The constrained policy evaluation is configured to update the shape and the size of the CAIS using a regularizer that promotes uniqueness of the updated CAIS and the corresponding value function.

For example, under persistence of excitation conditions, an embodiment can solve the above as a (regularized) least squares problem subject to the constraint that $P^+ \succ 0$ to obtain $P^+$ without knowing A or B. For the time instants when the learning occurs, the new value function matrix $P_{t+1}$ is set to $P^+$ obtained by solving the regularized least squares problem. For other time instants between learning time instants, the value function matrix obtained in the previous learning cycle is utilized.

In one embodiment, the regularized cost function of the constrained policy evaluation 701 is equivalent to the model-based cost function 702 with a regularization method to promote uniqueness of the optimizer. One embodiment of this regularization method includes optimizing the shape and size of the CAIS by selecting the optimal level set of the CAIS through $\rho$ 703. Minimizing the cost 701 subject to the constraints 711,721,731,741,751,761 results in an updated value matrix $\overline{P}_{t+1}$ and CAIS parametrized by $\overline{P}_{t+1}, \rho_{t+1}$. The cost function $\overline{J}_r(P)$ is expanded in algebraic Riccati equation (ARE) 751, which is the data-driven analogue of the left-hand-side of a model-based discrete ARE 752 along with the condition 741 which ensures P is positive definite. Finding $\overline{P}_{t+1}, \rho_{t+1}$ that minimizes the cost $|\overline{J}_r(P)|$ implies restriction to solutions that are close to the optimal value function matrix $P_\infty$ since that is the only stationary solution to the ARE. Constraint satisfaction is made possible by satisfying the constraints 711, 721, 731.

To that end, in some embodiments, the constrained policy evaluation performs a multi-objective optimization to minimize the cost function 701 of the operation of the system and to maximize a size metric of the updated CAIS to produce the updated CAIS and the corresponding updated value function. For example, one objective of the multi-objective optimization is to minimize a violation of an algebraic Riccati equation 751 with respect to the value function subject to the state constraints and the input constraints.

In some embodiments, the state constraints and the input constraints are imposed on the constrained policy iteration in a form of one or combination of matrix and vector inequalities 711, 721, 731, 741, and/or 761 on parameters defining the updated CAIS, the updated value function, and the updated control policy. In some implementations, the matrix and vector inequalities on the parameters are functions of the collected data and vary among the iterations.

For example, the inequality 711 ensures that the value function is contractive, and therefore, non-increasing for every $t \geq t_0$. This is evidence from the model-based equivalent inequality 712, which if multiplied by $x_t^T$ and $x_t$ from the left and right, respectively, yields $$x_{t+1}^T P x_{t+1} - \lambda x_t^T P x_t \leq -(1-\lambda) x_t^T P x_t \leq 0$$

for any t, since $0<\lambda<1$. This inequality 712 is therefore an ingredient to ensure that the updated control policies provide stability for the closed-loop system. The two inequalities 711 and 731 enforce that the state and input constraints with the current policy are satisfied in spite of the value function update, given the current state. This is because the inequalities 711 and 731 are the data-driven analogue of inequalities 722 and 732 that define conditions for enforcing state constraints by forcing current states to lie in the updated CAIS. The condition 741 ensures that the value function matrix is positive definite, and the positive scalar ρ allows the selection of sub- and super-level sets of the Lyapunov function. The inequality 761 is used to provide stability guarantees by restricting the rate of contraction of the Lyapunov function.

Some embodiments restrict the control policy to be linear, such that finding an optimal policy is tantamount to finding the minimizer $K_{t+1}$ of the policy improvement optimization problem $$\min_K \sum_{t=t_i+1}^{t_{i+1}} (x_t^T K^T R K x_t + x_t^T Q x_t + x_t^T (A+BK)^T P_{t+1}(A+BK) x_t) \quad (7)$$

where $t_i, t_{i+1} \in \mathcal{T}$. This is a quadratic optimization problem in K because $x_t$, Q, R, and $P_{t+1}$ are all known quantities in the window $\{t_i+1, t_i+2, \ldots, t_{i+1}\}$. Consequently, the policy improvement step (if one had model knowledge), would be $$K_{t+1}^* = -(R+B^T P_{t+1} B)^{-1} B^T P_{t+1} A.$$

In some embodiments, only the matrix B is known, the data-driven analogue of the control policy update requires the current policy, with which another batch of data $\{\bar{x}_t, \bar{u}_t, \bar{K}_t, \bar{x}_{t+1}\}_{t=t_i+1,\ldots,t_{i+1}}$ are gathered. A new policy is the optimizer of the least squares problem $$\min_K \frac{1}{2} \sum_{t_i+1}^{t_{i+1}} \bar{x}_t^T K^T R K \bar{x}_t + \bar{x}_{t+1}^T P_{t+1} \bar{x}_{t+1}.$$

FIG. 8 shows a schematic of updating the control policy using recursive least squares minimization of a violation of an algebraic Riccati equation with respect to the control policy subject to the state constraints and the input constraints according to one embodiment. One implementation of this embodiment solves the above least squares problem using a real-time recursive least squares (RLS) framework. This step in the data-driven constrained policy improvement updates the control policy while ensuring constraint satisfaction, according to some embodiments. Starting with a Hessian matrix ρI with ρ>0 to ensure non-singularity, the Hessian update is shown in 801. The corresponding gradient update 811 is performed in a data-driven manner, and the control policy update in an RLS framework 821 involves a Newton-step with the step size $\beta_t > 0$, typically chosen to be one. Note that the recursive least squares problem is solved without knowledge of model A using the updates. The step size could be reduced, that is, $\beta_t \geq 1$ can be chosen, e.g. based on the backtracking procedure 831 to impose the state and input constraints for each updated control policy. Note that 801 corresponds to a rank-m matrix update, where m denotes the number of control inputs. Therefore, its matrix inverse can be updated efficiently using the Sherman-Morrison formula, for example, in the form of m rank-one updates. The policy improvement can be terminated when the gradient is less than a threshold, for example, $|g_t| \leq \varepsilon_g$ for some pre-selected threshold $\varepsilon_g > 0$.

FIG. 9 shows a pseudocode of a method for data-driven constrained adaptive dynamic programming for linear systems, according to some embodiments. The general procedure corresponds to the sequence of high-level steps:

Accept an initial control policy and a corresponding CAIS;

Obtain a sequence of at least $t_i+1$ data points while the machine is persistently excited and compute a new ellipsoidal set defined by the matrix $\bar{P}_{t+1}$ and the scalar $\rho_{t+1}$ by solving the constrained policy evaluation problem as shown in FIG. 7;

At each time step, perform the constrained policy improvement step to compute $\bar{K}_{t+1}$ based on the real-time recursive least squares method as described in FIG. 8, in combination with the backtracking procedure to enforce state and input constraints.

If the policy improvement has converged based on the condition $|g_t| \leq \varepsilon_g$, return to (ii).

Figure 10A:
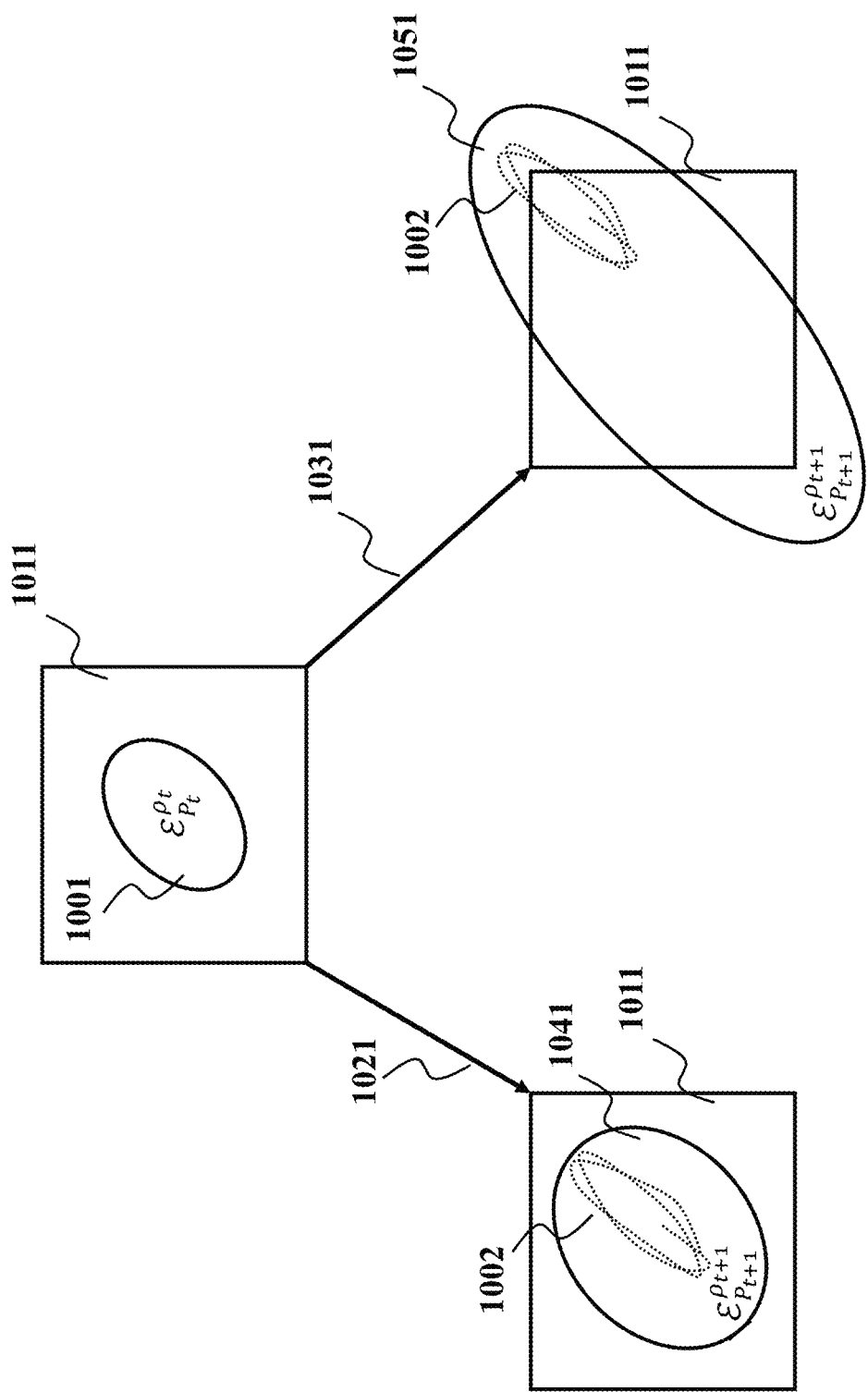
FIG. 10A is a schematic that demonstrates recursive constraint enforcement in constrained policy iteration and constraint violation in classical policy iteration, according to some embodiments.

FIG. 10A illustrates the utility of constrained policy iteration according to some embodiments. This utility is contrasted with an unconstraint policy iteration. Given an initial CAIS 1001 within the admissible state space $\mathbb{X}$ 1011, constrained policy iteration 1021 constructs an updated CAIS 1002 and feasible control policy such that closed-loop trajectories of the machine using this updated control policy 1041 remains within the admissible state space 1011. Conversely, unconstrained policy iteration 1031 does not ensure constraint satisfaction even if the initial CAIS 1001 is feasible as the updated CAIS 1051 can exceed the admissible state space 1011, resulting in closed-loop trajectories with the updated control policy 1002 violating constraints.

Figure 10B:
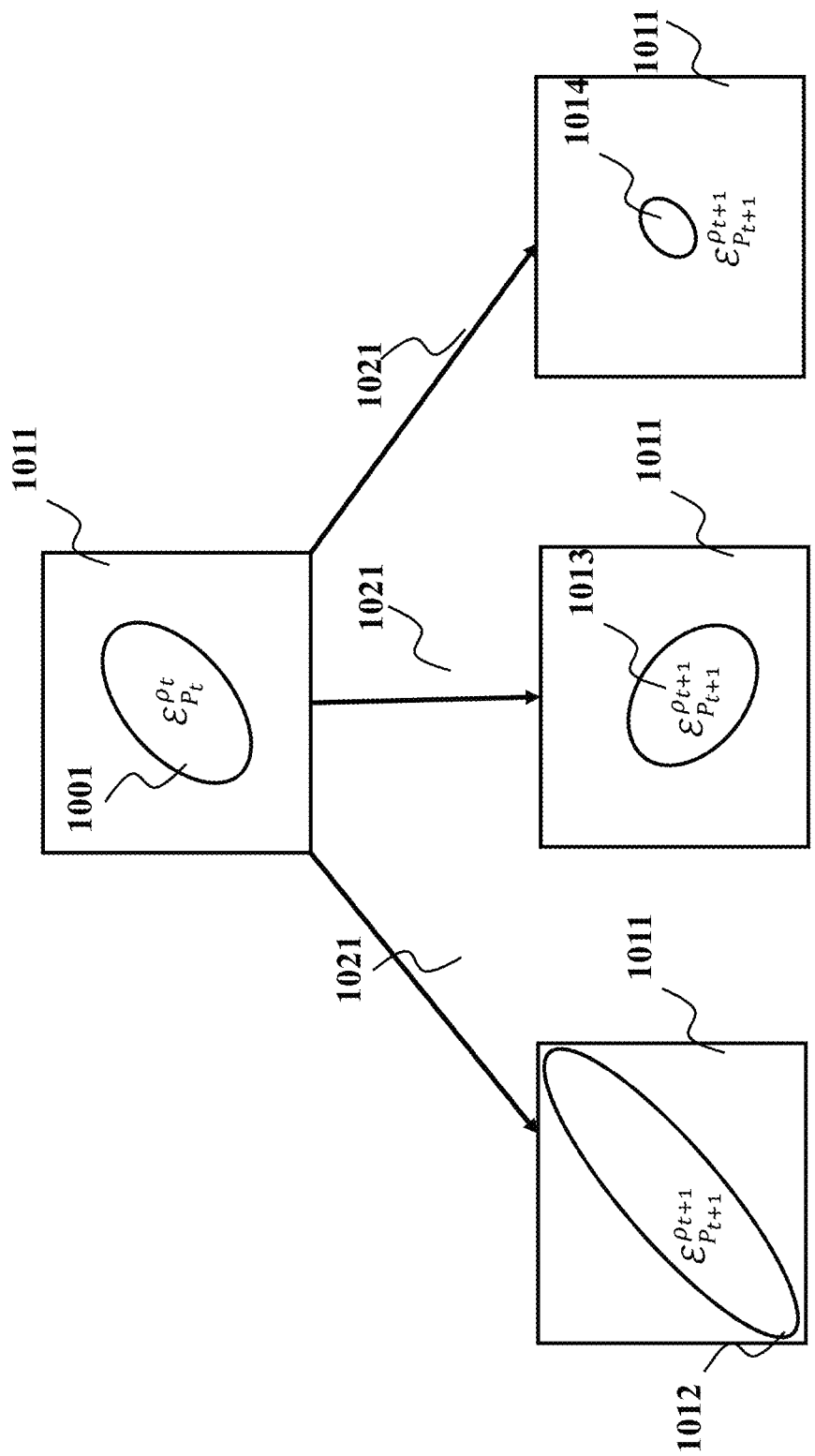
FIG. 10B is an illustration of how constrained policy iteration can result in updated CAIS that are contractions, expansions and/or rotations of the original CAIS, according to some embodiments.

FIG. 10B shows examples of different updates of the constraint admissible invariant set used by different embodiments. For example, one embodiment enables expansion 1011, contraction 1014, and rotation 1013, and combinations thereof, of the constraint admissible invariant sets. This is advantageous in reference tracking for instance where a more aggressive controller is required when the state is near the boundary of the state constraints. Different updates are also useful for applying this approach to nonlinear systems where (A, B) is a local linear approximation of the globally nonlinear dynamics.

Additionally or alternatively, some embodiments allow the ellipsoidal invariant sets to adapt its size and shape based on the local vector field. For example, suppose $\varepsilon_{P_\infty}{}^{P_\infty}$ denote the CAIS that is associated with the constrained optimal control policy and optimal value function. Also, an initial admissible policy $K_0$ whose associated CAIS $\varepsilon_{P_\infty}{}^{P_\infty}$ is contained within $\varepsilon_{P_\infty}{}^{P_\infty}$. Then the embodiments generate a sequence of $\varepsilon_{P_\infty}{}^{P_\infty}$ such that these CAISs expand, contract, and rotate as necessary until the sequence of invariant sets converges to the optimal CAIS.

Figure 11A:
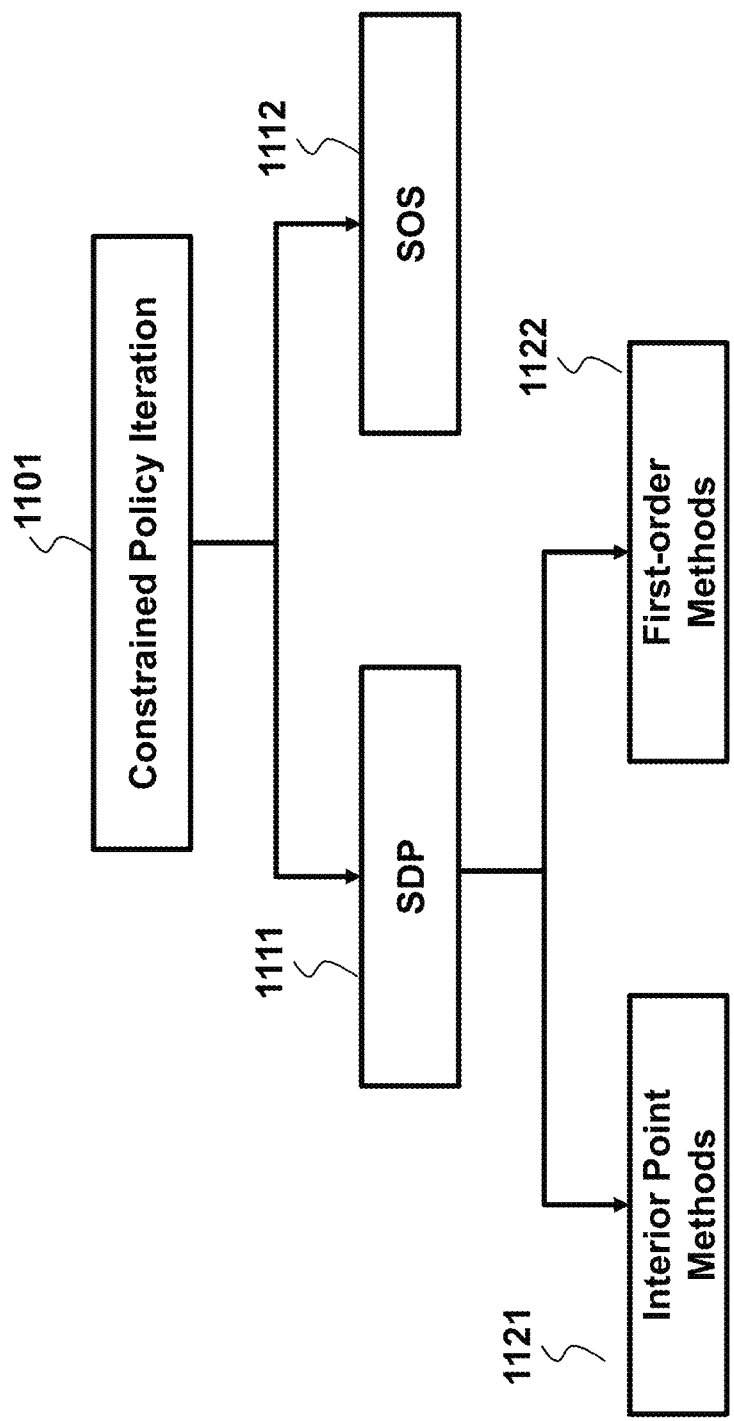
FIG. 11A is an illustration of how constrained policy iteration can be solved using different optimization frameworks, according to some embodiments.

FIG. 11A shows a block diagram of performing a constraint policy iteration using semidefinite programs according to some embodiments. Some embodiments are based on realization that constrained policy iteration/ADP 1101 can be posed as semidefinite programs SDPs 1111 that are convex optimization problems that can be solved in polynomial time. To that end, some embodiments solve the multi-objective optimization of the constrained policy evaluation using semi-definite program (SDP) that determines the updated CAIS as the geometrical transformation of the current CAIS. Hence, the computational complexity can be reduced with respect to implementations of IPMs for solving SDPs that have a computational complexity $O(n^6)$ when solving for n×n matrix variables and a memory complexity of $O(n^4)$.

For example, one embodiment uses interior point methods (IPMs) 1121 to implement SDP 1111. Another embodiment, uses first order optimization methods 1122 such as, e.g., the alternating direction method of multipliers (ADMM), to further reduce iteration complexity and memory requirements, even though these methods typically require more iterations in practice. Note that, instead, the policy improvement steps are computationally cheap because both the low-rank update techniques for the Hessian matrix and the matrix-vector multiplication in can be performed with a complexity $O(n^2m^2)$ that scales quadratically with the dimensions of the policy matrix K. Another embodiment can use sum-of-squares (SOS) programming 1112 to extend to nonlinear systems.

Figure 11B:
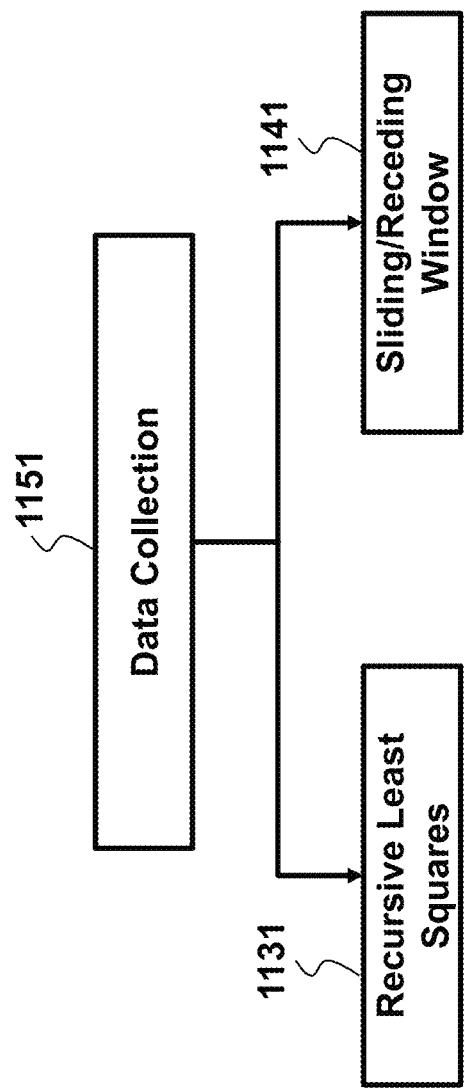
FIG. 11B is a schematic of how data collection for constrained policy evaluation can take place using recursion or in a sliding window approach, according to some embodiments.

FIG. 11B shows a method for data collection indicative of state of the controlled machine according to some embodiments. In these embodiment, the data collection 1151 for the policy evaluation step is computed also using a recursive least squares type implementation 1131 or in a receding horizon/sliding window manner 1141. In the RLS formulation, each data point results in an update of the optimization variables in an on-line manner 801, 811, 821. In receding horizon/sliding window approaches, each data point in conjunction with prior data points (depending on the length of the window selected) contribute batch-wise to ensure rank conditions such that the data-driven regression problem has a solution (see FIG. 7). However, given the computational complexity of treating linear matrix inequalities in the SDP formulation, a batch-type approach as in one embodiment would typically be preferred for real-time feasible control applications under strict timing requirements.

Figure 12A:
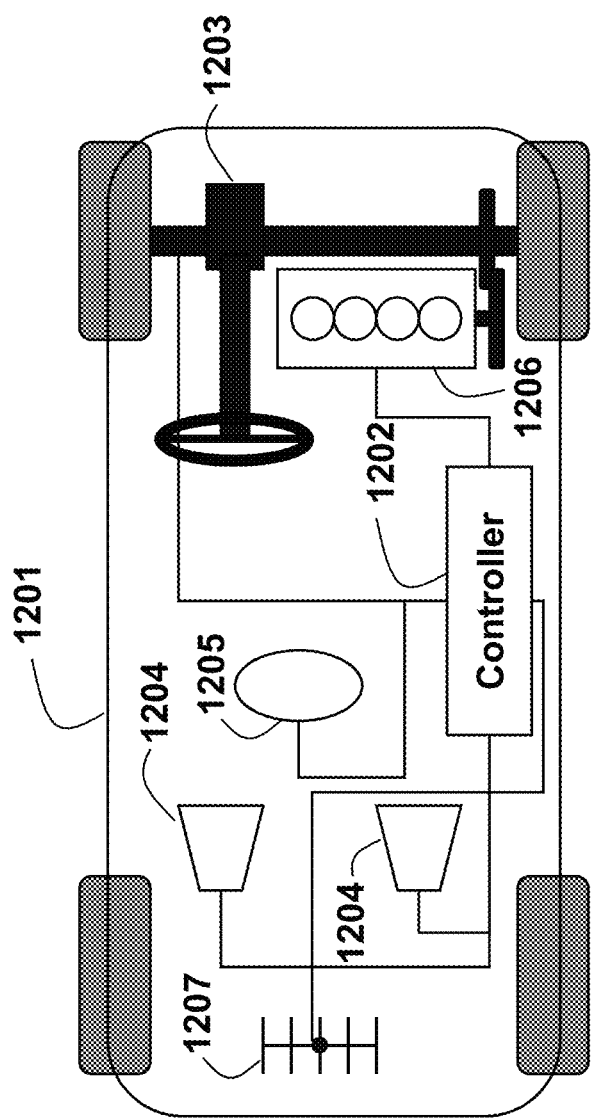
FIG. 12A is a schematic of a vehicle including a data-driven controller employing principles of some embodiments.

FIG. 12A shows a schematic of a vehicle 1201 including a data-driven constrained controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
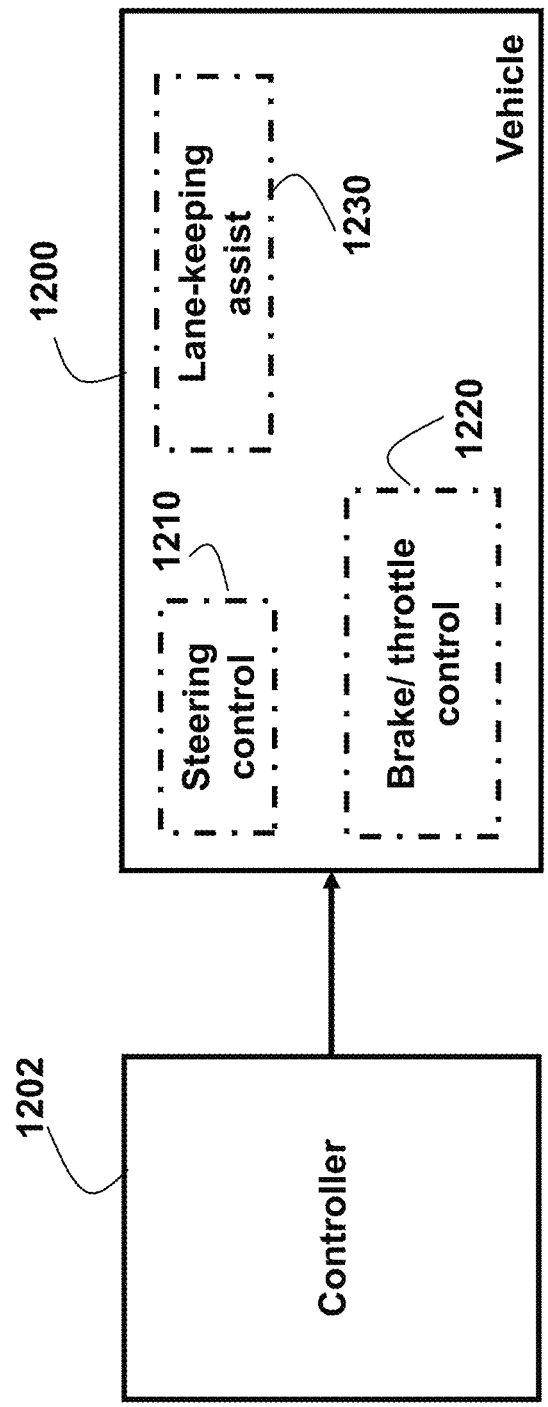
FIG. 12B is a schematic of the interaction between the data-driven controller employing principles of some embodiments and the controllers of the vehicle 1001 according to some embodiments.

FIG. 12B shows a schematic of interaction between the data-driven controller 1202 and the controllers 1200 of the vehicle 1201 according to some embodiments. For example, in some embodiments, the controllers 1200 of the vehicle 1201 are steering 1210 and brake/throttle controllers 1220 that control rotation and acceleration of the vehicle 1200. In such a case, the data-driven controller 1202 outputs control inputs to the controllers 1210 and 1220 to control the state of the vehicle. The controllers 1200 can also include high-level controllers, e.g., a lane-keeping assist controller 1230 that further process the control inputs of the predictive controller 1202. In both cases, the controllers 1200 maps use the outputs of the predictive controller 1202 to control at least one actuator of the vehicle, such as the steering wheel and/or the brakes of the vehicle, in order to control the motion of the vehicle. States $x_t$ of the vehicular machine could include position, orientation, and longitudinal/lateral velocities; control inputs $u_t$ could include lateral/longitudinal acceleration, steering angles, and engine/brake torques. State constraints on this system can include lane keeping constraints and obstacle avoidance constraints. Control input constraints may include steering angle constraints and acceleration constraints. Collected data could include position, orientation, and velocity profiles, accelerations, torques, and/or steering angles.

Figure 13:
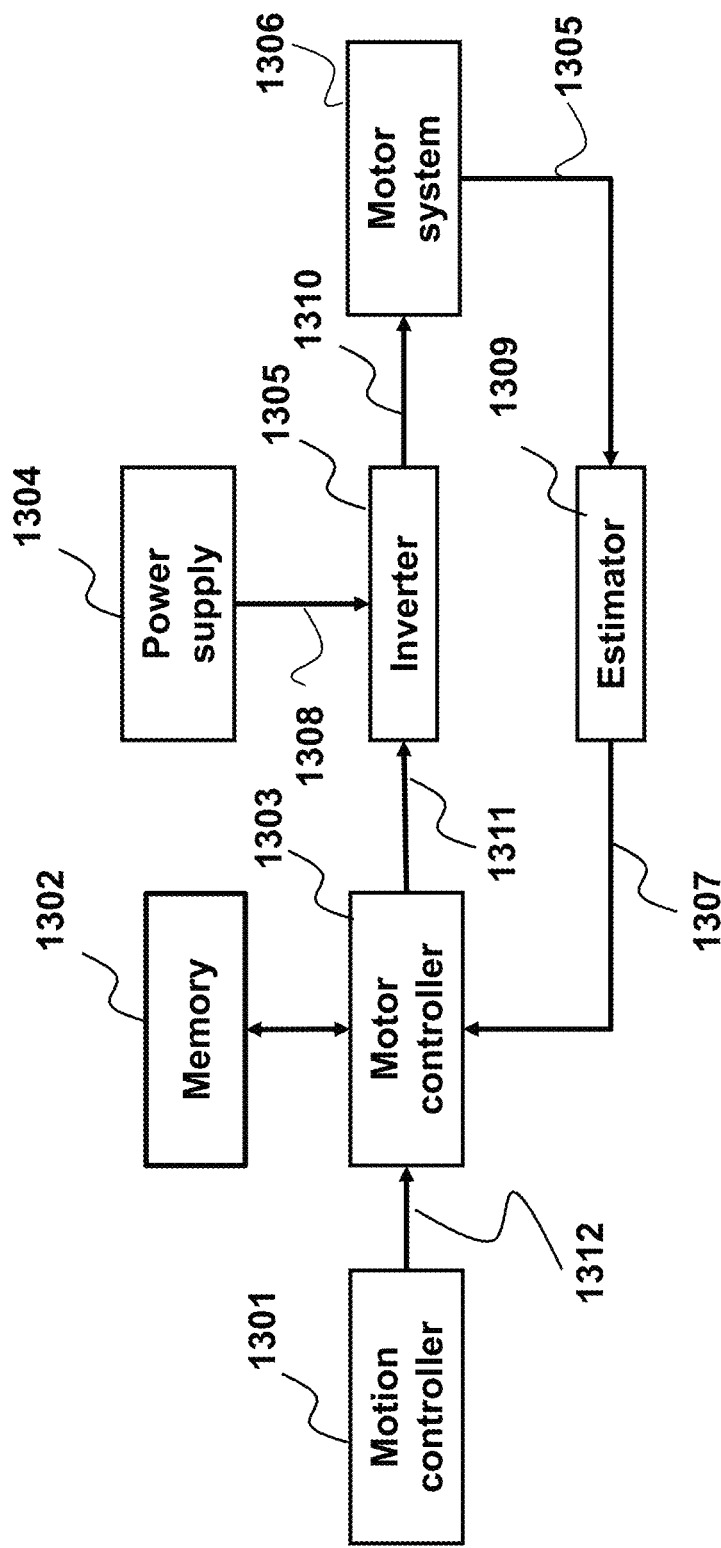
FIG. 13 is a block diagram of a motor drive to control an electromechanical motor using a data-driven controller employing principles of some embodiments.

FIG. 13 shows a block diagram of a control system for controlling a motor according to one embodiment. A data-driven controller 1303 starts with an initial stabilizing output feedback control policy, obtains an output feedback optimal control policy through a process employed by various embodiments. Reference flux and speed 1312 is generated in 1301 and sent over to motor controller 1303. The motor controller retrieves executable code from memory 1302 and determines an estimated state at every sample time according to an estimator 1309 that uses the motor output 1305; produces a control command according to a control policy obtained by constrained policy improvement; solves a constrained policy evaluation based on a sequence of the motor states 1307 estimated by 1306 at multiple time instants, and iterates to obtain the optimal control policy. Motor controller outputs a control command, representing preferred three-phase AC voltage in one embodiment, to an inverter 1305, which subsequently generates three-phase voltages 1310 to the induction motor 1306. In one embodiment, the output 1305 includes current in the stator winding, and rotor speed. States $x_t$ for the induction motor may include the stator fluxes, line currents, and rotor speed. Control inputs $u_t$ may include inverter excitation voltages. Constraints on the input voltages act as input constraints, and constraints on stator fluxes, rotor speeds, and line currents as state constraints.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for controlling an operation of a system subject to state constraints in continuous state space of the system and subject to control input constraints in continuous control input space of the system, comprising:
   a memory configured to store a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS;
   an input interface to accept data indicative of measurements of the state of the system; and
   a processor configured to jointly control the system and update the CAIS and the control policy, wherein, for performing the joint control and update, the processor is configured to
      control the system using the control policy to collect data including a sequence of control inputs generated using the control policy and a sequence of measurements of states of the system within the CAIS corresponding to the sequence of control inputs, such that the data collected at a current time include the control inputs and the measurements of the state caused by the corresponding control inputs at previous times; and
      perform a constrained policy iteration using the collected data for the current control time to update the CAIS and the corresponding control policy, wherein, to perform the constrained policy iteration, the processor is configured to
         perform a constrained policy evaluation to produce an updated CAIS and a corresponding updated value function of state of the system, wherein the updated value function improves a cost function of the operation of the system and the updated CAIS enforces satisfaction of the state and control input constraints; and
         perform a constrained policy improvement to produce an updated control policy that improves the cost function of operation according to the updated CAIS and the corresponding updated value function.

2. The apparatus of claim 1, wherein the constrained policy evaluation performs a multi-objective optimization to minimize the cost function of the operation of the system and to maximize a size of the updated CAIS to produce the updated CAIS and the corresponding updated value function.

3. The apparatus of claim 2, wherein one objective of the multi-objective optimization is to minimize a violation of an algebraic Riccati equation with respect to the value function subject to the state constraints and the input constraints.

4. The apparatus of claim 2, wherein the multi-objective optimization optimizes one or combination of the cost function of the operation of the controlled system, a stability of the controlled system, and a size metric of the updated CAIS.

5. The apparatus of claim 1, wherein the constrained policy evaluation generates the updated CAIS and the corresponding updated value function jointly allowing the updated CAIS to be a geometrical transformation of the current CAIS, wherein the geometrical transformation includes one or combination of expansion, contraction, and rotation of the current CAIS.

6. The apparatus of claim 5, wherein the processor is configured to solve the multi-objective optimization using semi-definite program (SDP) that determines the updated CAIS as the geometrical transformation of the current CAIS.

7. The apparatus of claim 5, wherein the processor is configured to update the shape and the size of the CAIS using a regularizer that promotes uniqueness of the updated CAIS and the corresponding value function.

8. The apparatus of claim 1, wherein the state constraints and the input constraints are imposed on the constrained policy iteration in a form of one or combination of matrix and vector inequalities on parameters defining the updated CAIS, the updated value function, and the updated control policy.

9. The apparatus of claim 8, wherein the matrix and vector inequalities on the parameters are functions of the collected data.

10. The apparatus of claim 1, wherein the constrained policy improvement updates the control policy using recursive least squares minimization of a violation of an algebraic Riccati equation with respect to the control policy subject to the state constraints and the input constraints.

11. The apparatus of claim 1, wherein the processor is configured to repeat the joint control and update until a termination condition is met.

12. The apparatus of claim 1, wherein the processor is configured to repeat the joint control and update until a termination condition is met to produce an optimal control policy, and after that to control the system using the optimal control policy.

13. The apparatus of claim 1, wherein the processor is configured to perform the constrained policy evaluation using one ora combination of an alternating minimization, an accelerated gradient, a Newton-type, and an interior point method.

14. The apparatus of claim 1, wherein the constrained policy evaluation and the constrained policy improvement are executed jointly to perform a multi-objective optimization that minimizes the cost of the operation of the system while maximizes a size metric of the updated CAIS to produce the updated CAIS, the updated value function, and the updated control policy.

15. The apparatus of claim 1, wherein the system is a vehicle controlled to perform one or combination of a lane keeping, a cruise control, and an obstacle avoidance operation, wherein the state of the vehicle includes one or a combination of a position, an orientation, and a longitudinal velocity, and a lateral velocity of the vehicle, wherein the control inputs include one or a combination of a lateral acceleration, a longitudinal acceleration, a steering angle, an engine torque, and a brake torque, wherein the state constraints includes one or a combination of velocity constraints, lane keeping constraints, and obstacle avoidance constraints, wherein the control input constraints include one or a combination of steering angle constraints, and acceleration constraints, and wherein the collected data include one or a combination of values of positions, orientations, velocities, acceleration, torques, and steering angles of the vehicle.

16. The apparatus of claim 1, wherein the system is an induction motor controlled to perform a task, wherein the state of the motor include one or a combination of a stator flux, a line current, and a rotor speed, wherein the control inputs include values of excitation voltage, wherein the state constraints includes constraints on values of one or a combination of the stator flux, the line current, and the rotor speed, wherein the control input constraints include a constraint on the excitation voltage, and wherein the collected data include measurements of one or a combination of the stator flux, the line current, and the rotor speed.

17. A method for controlling an operation of a system subject to state constraints in continuous state space of the system and subject to control input constraints in continuous control input space of the system, wherein the method uses a processor coupled to a memory storing a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS, wherein the processor is coupled with stored instructions implementing the method, wherein the instructions, when executed by the processor carry out at least some steps of the method, comprising:

accepting data indicative of the state of the system; and controlling the system using the control policy to collect data including a sequence of control inputs generated using the control policy and a sequence of measurements of states of the system within the CAIS corresponding to the sequence of control inputs, such that the data collected at a current time include the control inputs and the measurements of the state caused by the corresponding control inputs at previous times; and performing a constrained policy iteration using the collected data to update the CAIS and the corresponding control policy, wherein the constrained policy iteration includes performing a constrained policy evaluation to produce an updated CAIS and a corresponding updated value function of the state of the system, wherein the updated value function improves a cost function of the operation of the system and the updated CAIS enforces satisfaction of the state and control input constraints; and performing a constrained policy improvement to produce an updated control policy that improves the cost function of operation according to the updated CAIS and the corresponding updated value function.

18. The method of claim 17, wherein the constrained policy evaluation performs a multi-objective optimization to minimize the cost function of the operation of the system and to maximize a size of the updated CAIS to produce the updated CAIS and the corresponding updated value function.

19. A non-transitory computer readable storage medium embodied thereon a program executable by a processor for performing a method for controlling an operation of a system subject to state constraints in continuous state space of the system and subject to control input constraints in continuous control input space of the system, wherein the medium stores a constraint admissible invariant set (CAIS) of states of the system satisfying the state constraints and a corresponding control policy mapping a state of the system within the CAIS to a control input satisfying the control input constraints, wherein a control of the system having the state within the CAIS according to the corresponding control policy maintains the state of the system within the CAIS, the method comprising:

accepting data indicative of the state of the system; and controlling the system using the control policy to collect data including a sequence of control inputs generated using the control policy and a sequence of measurements of states of the system within the CAIS corresponding to the sequence of control inputs, such that the data collected at a current time include the control inputs and the measurements of the state caused by the corresponding control inputs at previous times; and performing a constrained policy iteration using the collected data to update the CAIS and the corresponding control policy, wherein the constrained policy iteration includes performing a constrained policy evaluation to produce an updated CAIS and a corresponding updated value function of the state of the system, wherein the updated value function improves a cost function of the operation of the system and the updated CAIS enforces satisfaction of the state and control input constraints; and performing a constrained policy improvement to produce an updated control policy that improves the cost function of operation according to the updated CAIS and the corresponding updated value function.

20. The medium of claim 19, wherein the constrained policy evaluation performs a multi-objective optimization to minimize the cost function of the operation of the system and to maximize a size of the updated CAIS to produce the updated CAIS and the corresponding updated value function.

* * * * *